US011427270B2

United States Patent
Howe et al.

(10) Patent No.: US 11,427,270 B2
(45) Date of Patent: Aug. 30, 2022

(54) VEHICLE WITH DEPLOYABLE TOWING WHEELS AND SUSPENSION

(71) Applicant: Howe & Howe Inc., Waterboro, ME (US)

(72) Inventors: Michael Howe, Limerick, ME (US); Zachary Edward Sawyer, Alfred, ME (US); Jason Wan Xu, Towson, MD (US); Cote Taylor, Dearborn, MI (US)

(73) Assignee: Howe & Howe Inc., Waterboro, ME (US)

( * ) Notice: Subject to any disclaimer, the term of this patent is extended or adjusted under 35 U.S.C. 154(b) by 116 days.

(21) Appl. No.: 16/887,543

(22) Filed: May 29, 2020

(65) Prior Publication Data
US 2020/0377162 A1 Dec. 3, 2020

Related U.S. Application Data

(60) Provisional application No. 62/988,690, filed on Mar. 12, 2020, provisional application No. 62/855,511, filed on May 31, 2019.

(51) Int. Cl.
*B62D 55/04* (2006.01)
*B62D 61/12* (2006.01)
*B62D 55/02* (2006.01)
*B62D 55/104* (2006.01)
*B60D 1/66* (2006.01)

(52) U.S. Cl.
CPC ............. *B62D 55/04* (2013.01); *B62D 55/02* (2013.01); *B62D 61/12* (2013.01); *B60D 1/665* (2013.01); *B60G 2300/32* (2013.01); *B62D 55/104* (2013.01)

(58) Field of Classification Search
CPC ...... B62D 55/04; B62D 55/02; B62D 55/104; B62D 61/12; B60D 1/665; B60G 3/08
See application file for complete search history.

(56) References Cited

U.S. PATENT DOCUMENTS

| 1,296,309 | A | * | 3/1919 | Netzel | ................... | B62D 55/02 |
| | | | | | | 180/9.28 |
| 1,376,648 | A | * | 5/1921 | Schneider | .............. | B62D 55/02 |
| | | | | | | 280/28.5 |

(Continued)

FOREIGN PATENT DOCUMENTS

| CN | 107264655 | 10/2017 |
| WO | 1995/27646 | 10/1995 |

(Continued)

OTHER PUBLICATIONS

Mech4study, Types of Suspension Springs: Helical Spring, Leaf Spring, Torsion bar Rubber Spring, Sep. 9, 2015 (Year: 2015).*

*Primary Examiner* — Jacob D Knutson
*Assistant Examiner* — Abigail R Hymel
(74) *Attorney, Agent, or Firm* — BainwoodHuang

(57) ABSTRACT

Example techniques have been presented for providing tracked vehicles with deployable towing wheels. Such techniques involve a track vehicle having a vehicle body, a track coupled to the vehicle body, and a wheel assembly coupled to the vehicle body. The wheel assembly includes a wheel and is operable to assume a towing position in which at least a portion of the wheel extends below the track and enables the tracked vehicle to be towed on the wheel without the track making ground contact.

16 Claims, 23 Drawing Sheets

(56) References Cited

U.S. PATENT DOCUMENTS

| | | | | |
|---|---|---|---|---|
| 1,376,649 | A * | 5/1921 | Schneider | B62D 55/02 |
| | | | | 280/28.5 |
| 1,395,144 | A * | 10/1921 | Rimailho | B62D 55/02 |
| | | | | 180/9.3 |
| 1,443,619 | A * | 1/1923 | De Virel | B62D 55/02 |
| | | | | 180/9.3 |
| 2,161,760 | A * | 6/1939 | Hacker | B62D 55/02 |
| | | | | 180/9.38 |
| 4,374,592 | A | 2/1983 | Geary et al. | |
| 7,475,745 | B1 * | 1/2009 | DeRoos | B62D 55/02 |
| | | | | 180/8.1 |
| 9,637,186 | B1 * | 5/2017 | Goldenberg | B62D 55/04 |
| 2004/0011574 | A1 | 1/2004 | Borgwarth et al. | |
| 2016/0257358 | A1 * | 9/2016 | Johnson | B62D 55/286 |
| 2017/0001672 | A1 * | 1/2017 | Bodin | B62D 55/104 |
| 2018/0043947 | A1 * | 2/2018 | Brazier | B62D 55/04 |

FOREIGN PATENT DOCUMENTS

| | | | | |
|---|---|---|---|---|
| WO | 1999/54554 | | 10/1999 | |
| WO | WO-2006111693 | A2 * | 10/2006 | B62D 59/04 |
| WO | 2013/054012 | | 4/2013 | |

* cited by examiner

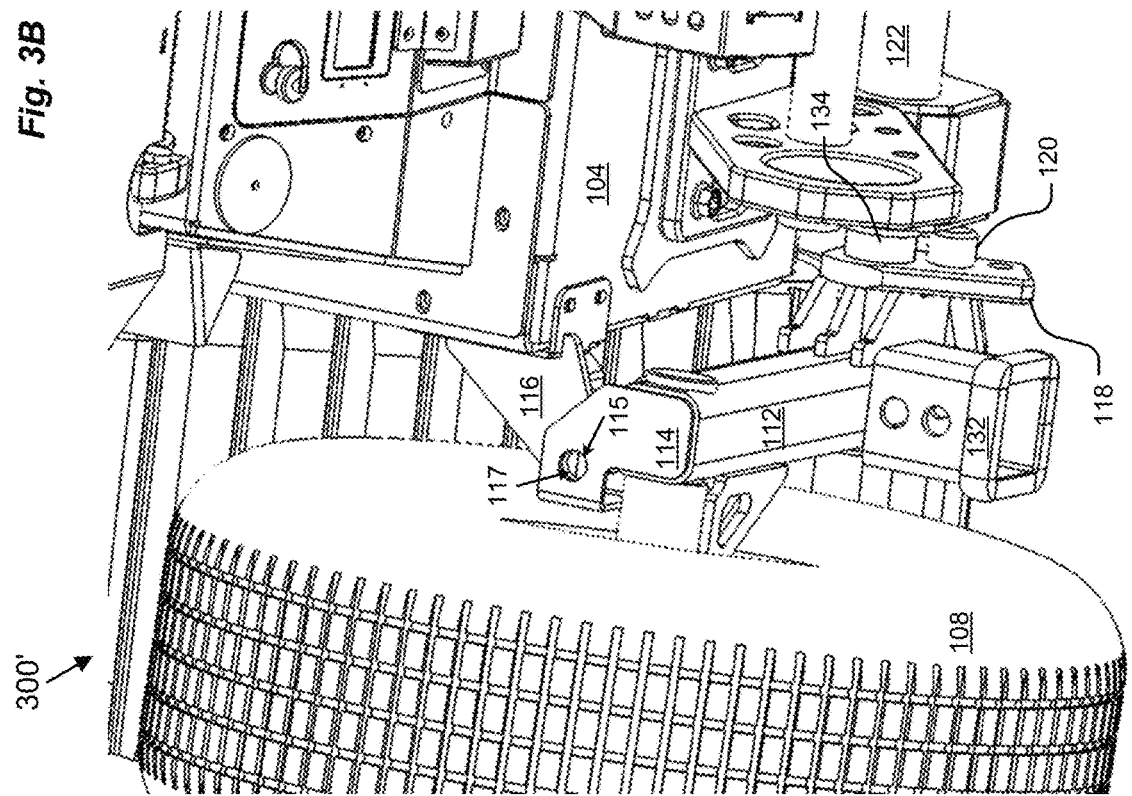
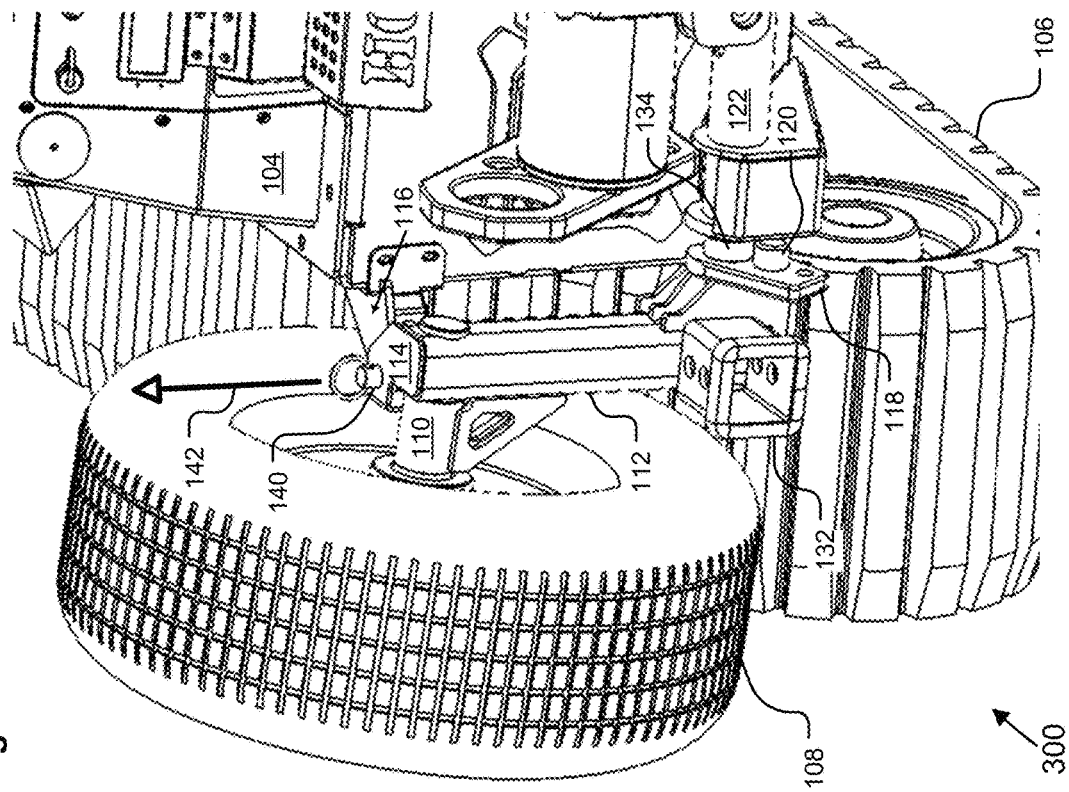

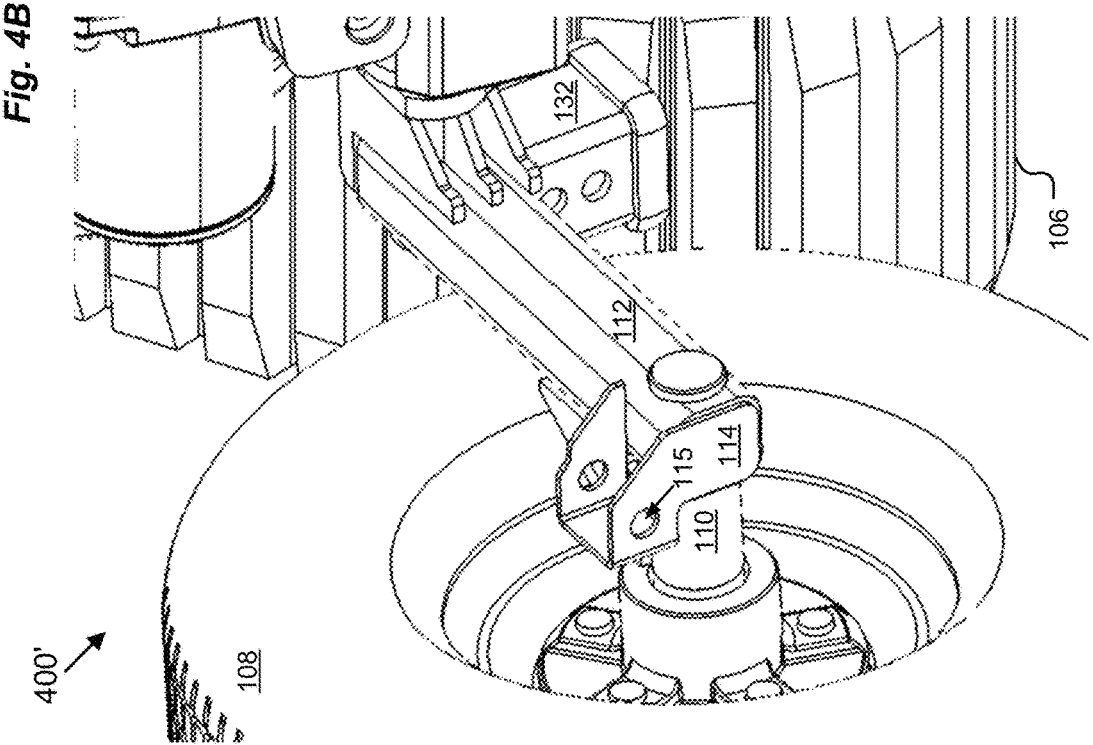
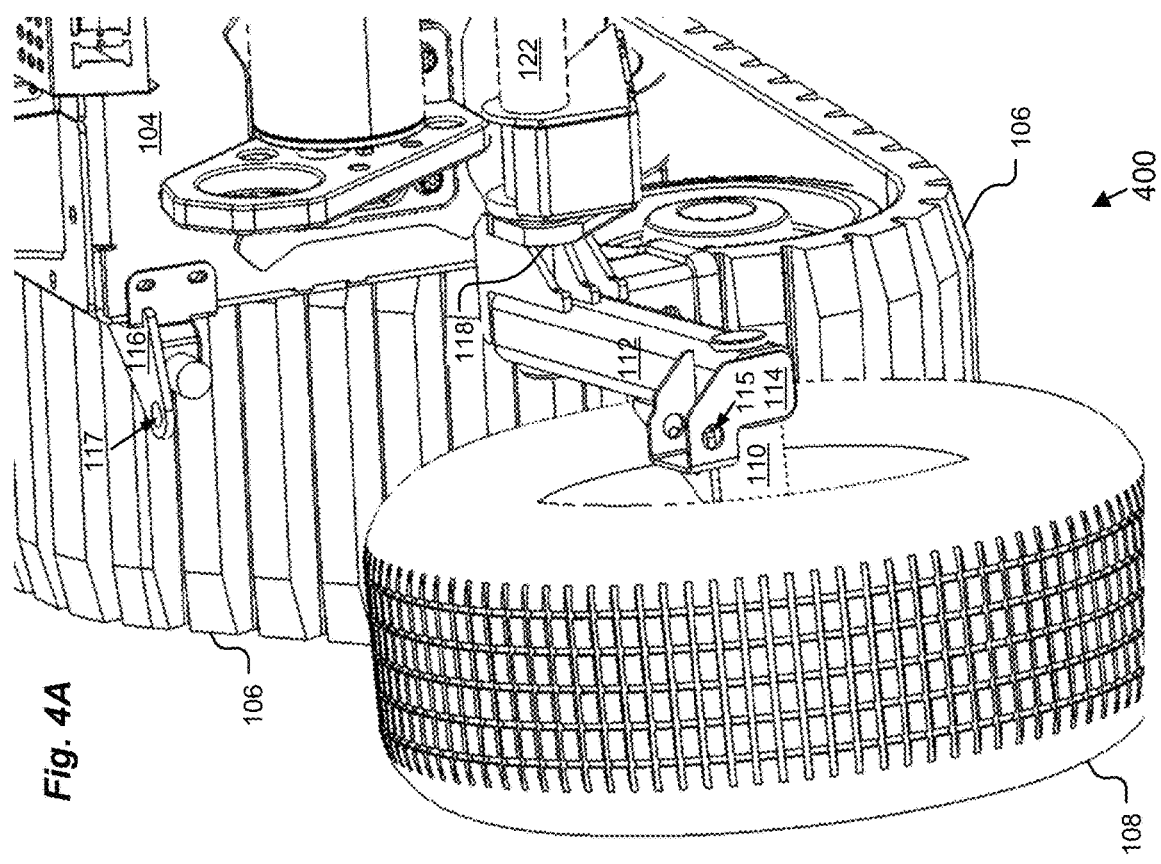

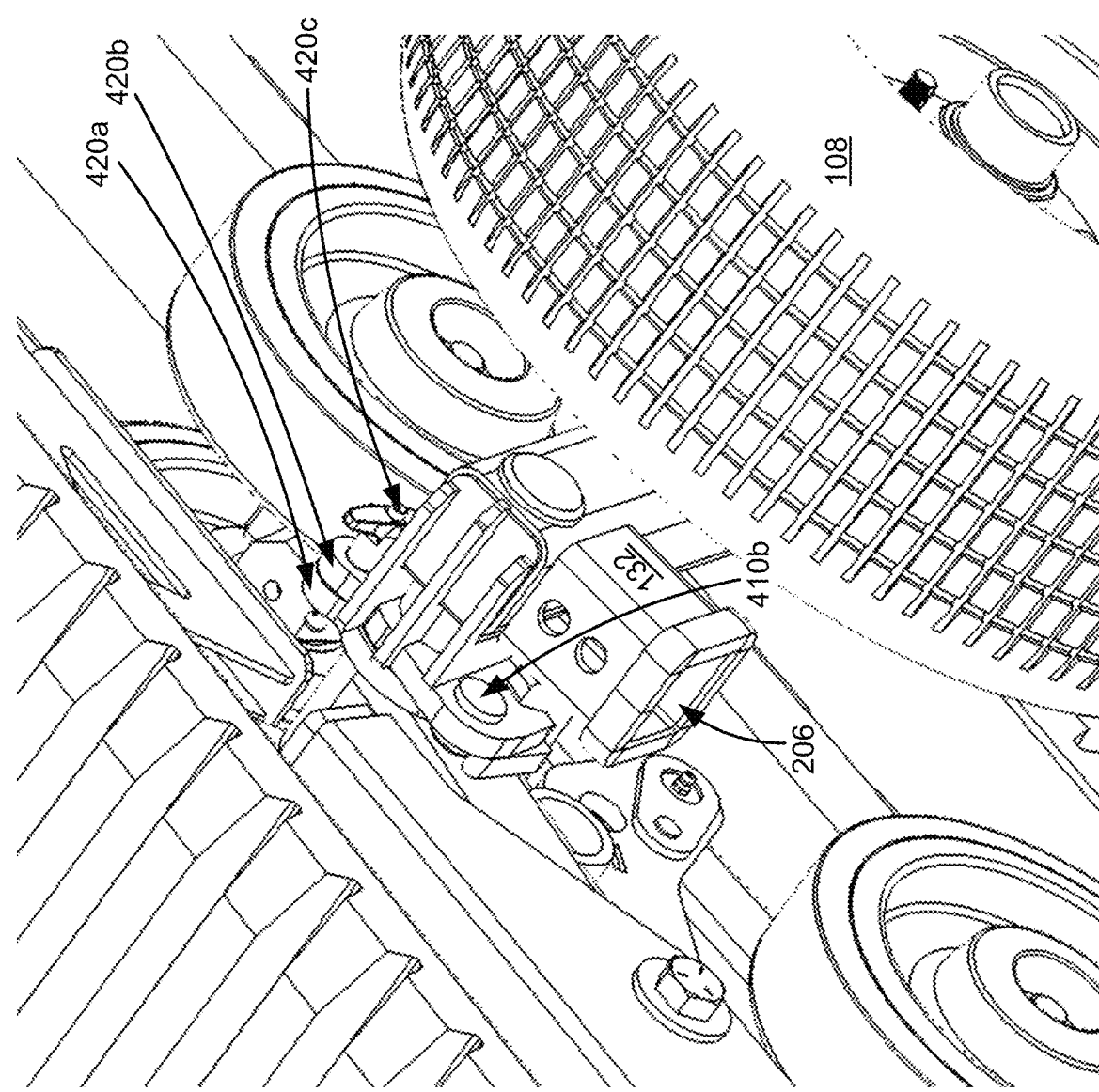

VEHICLE WITH DEPLOYABLE TOWING WHEELS AND SUSPENSION

RELATED APPLICATIONS

This Application claims priority to the following prior applications:
U.S. Provisional Application No. 62/855,511, filed on May 31, 2019; and
U.S. Provisional Application No. 62/988,690, filed Mar. 12, 2020.
The contents and teachings of these prior applications are incorporated herein by this reference in their entirety.

BACKGROUND

Conventional tracked vehicles are well suited for travel over uneven and/or unstable terrain. A typical tracked vehicle includes a drivetrain that drives one or more tracks. Given that tracks provide much more ground contact than wheels, tracked vehicles can be used in environments that present challenges to vehicles driven on wheels, such as where the ground is slippery or uneven.

SUMMARY

Conventional tracked vehicles are effective options for travel over uneven or unstable terrain. It is rare, however, for a tracked vehicle to operate at high speeds, e.g., above 40 kilometers per hour. Even when high-speed operation is possible, sustained travel at such speeds can damage tracks and mechanical structures that support them, as well as roads on which the vehicles are driven. It is not unusual, therefore, for a tracked vehicle to be towed when it is necessary to transport the tracked vehicle over long distances and/or at high speeds.

Towing a tracked vehicle generally requires a flatbed trailer. For example, a trailer can be tilted so that one end contacts the ground. The tracked vehicle can then be driven onto the trailer and secured in place. Typically, getting the tracked vehicle properly placed on the flatbed trailer is at least a two-person job, and it is not without risk to personnel. It also requires that the trailer be made available. The trailer itself may be a large, heavy object, which can be costly to transport to the required site and costly to return after the tracked vehicle has been moved. Thus, a less costly and more convenient solution for transporting a tracked vehicle is needed.

This need may be addressed in whole or in part by providing towing wheels that may be deployed for towing tracked vehicles with the tracks of the vehicles raised off the ground.

Certain embodiments are directed to an apparatus that includes a tracked vehicle. The tracked vehicle includes a vehicle body and a track. The apparatus further includes a wheel assembly configured to couple to the vehicle body and to provide movement of a wheel between a first position and a second position. With the wheel disposed in the first position, no portion of the wheel extends below a lowest extent of the track. However, at least a portion of the wheel extends below the lowest extent of the track with the wheel disposed in the second position, such that at least part of the weight of the tracked vehicle is borne by the wheel.

Other embodiments are directed to a method of towing a tracked vehicle having a track. The method includes swinging a wheel assembly coupled to the tracked vehicle about a first axis substantially parallel to but offset from a second axis of a wheel of the wheel assembly, until the wheel reaches a towing position in which a bottom portion of the wheel extends below a lowest extent of the track such that at least part of the weight of the vehicle is borne by the wheel. The method further includes locking the wheel assembly into the towing position to prevent further swinging and towing the tracked vehicle supported on the wheel but not the track.

Further embodiments are directed to a tracked vehicle that includes a vehicle body, a track coupled to the vehicle body, a suspension assembly, and a wheel assembly coupled to the vehicle body via the suspension assembly. The wheel assembly includes a wheel and is operable to assume a towing position in which at least a portion of the wheel extends below the track to enable the tracked vehicle to be towed on the wheel without the track making ground contact.

Still further embodiments are directed to a tracked vehicle that includes a vehicle body, a pair of tracks coupled to the vehicle body, and a plurality of wheel assemblies coupled to the vehicle body via respective suspension assemblies. The plurality of wheel assemblies includes respective wheels operable to extend below the tracks to enable the tracked vehicle to be towed on the wheels without the tracks making ground contact.

Advantageously, a tracked vehicle can be towed without needing a trailer, and arranging the vehicle in the towing configuration can generally be accomplished by a single operator.

The foregoing summary is presented for illustrative purposes to assist the reader in readily grasping example features presented herein and is not intended to be limiting.

BRIEF DESCRIPTION OF THE SEVERAL VIEWS OF THE DRAWINGS

Features and advantages will be apparent from the following description of particular embodiments of the invention, as illustrated in the accompanying drawings, in which like reference characters refer to the same or similar parts throughout the different views.

FIGS. 3A-3B depict other views of an example tracked vehicle with its rear wheel in the storage configuration for use in connection with various embodiments.

FIGS. 4A-4B depict other views of an example tracked vehicle with its rear wheel in the support configuration for use in connection with various embodiments.

FIG. 20 is a perspective view of an example mechanism for locking the towing wheels in a towing configuration.

DETAILED DESCRIPTION OF THE INVENTION

Figure 1:
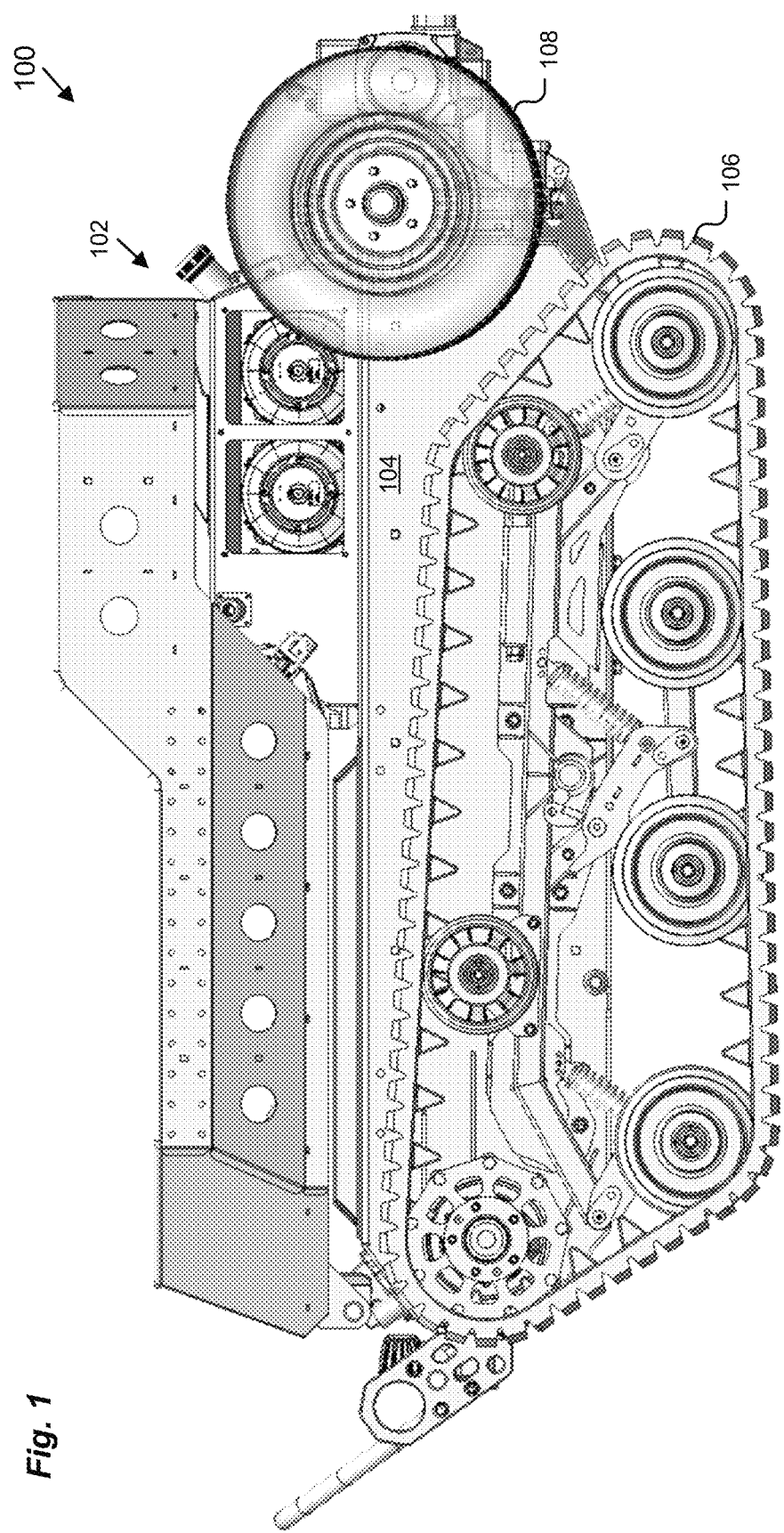
FIG. 1 depicts a view of an example tracked vehicle with a rear wheel in a storage configuration for use in connection with various embodiments.

Embodiments are directed to vehicles, including tracked vehicles, with one or more supplemental wheels installed that may be used for towing and/or for extra ground support (e.g., extending the effective track length).

This document is presented in the following sections to assist the reader:
Section I presents example techniques for towing a tracked vehicle; and
Section II presents an example suspension system for use with a tracked vehicle.
Section I: Example Techniques for Towing a Tracked Vehicle A disclosed technique provides a tracked vehicle having deployable towing wheels. In an example, each towing wheel is part of a wheel assembly that includes an axle around which the wheel can be turned and an arm (offset arm) that extends substantially perpendicularly from the axle. The offset arm has a distal end from which a shaft (offset shaft) extends substantially parallel to the axle. Establishing the first position may involve inserting the shaft into a receptacle, such as a tube in a body of the vehicle, and orienting the wheel assembly so that the wheel is at or above the lowest part of the tracks. Establishing the second position may involve rotating the wheel assembly about the receptacle so that at least a portion of the wheel falls below a lowest part of the tracks. Various retainers may be used for holding the wheels in the second position.

In some examples, establishing the second position involves rotating the wheel assembly about an axis formed by the receptacle until the wheel swings below the tracks. In some cases, a bracing bracket is provided to limit rotation of the wheel assembly to an angle slightly past vertical, such that normal forces of gravity tend to hold the wheel assembly in place with the weight of the vehicle (on the affected side) resting on the wheel and with the tracks elevated above the ground. Rotation may be accomplished using a lever that inserts into a leverage receiver in the wheel assembly. Rotating the wheel assembly using the lever has the effect of jacking up the vehicle onto the wheel. Once rotation passes vertical and the limit imposed by the bracing bracket is reached, no additional force is needed to hold the wheel in the second position, and an operator can secure the wheel in place using retainers. The same process may be repeated on the other side of the vehicle, and/or with as many wheel assemblies as desired.

In some examples, a wheel assembly may be stored or used elsewhere on the tracked vehicle when it is not being used for towing. For example, a second receptacle may be provided in the body of the vehicle for receiving and holding the shaft of the wheel assembly. The wheel assembly may be rotated about the second receptacle to a first angle for storage. The wheel assembly may also be rotated to a second angle for extending an effective length of the track. For example, the second receptacle may be located near the rear of the vehicle. The first angle may place the wheel above a ground level of the track, such that the wheel is not in contact with the ground, while the second angle may place the wheel approximately at or slightly above the ground level of the track, so that the wheel acts as a track extension. By extending the effectively length of the track, the wheel increases stability and helps to prevent the vehicle from flipping over during steep climbs or descents.

FIG. 1 depicts a view 100 of an example tracked vehicle 102. An example tracked vehicle of the kind as shown may be provided as an equipment carrier for accompanying soldiers in the field.

Vehicle 102 includes a vehicle body 104 and a track 106 configured to propel the vehicle 106 across the ground as is well-known in the art. Typically, the vehicle 106 has two tracks (as shown), although any number of tracks may be provided. As further shown, vehicle 102 includes one or more wheels 108, which may also be referred to herein as "towing wheels" or "supplemental wheels." As depicted in view 100, the wheels 108 are shown in a raised storage configuration at the rear of the vehicle 102, which allows the wheels 108 to be tucked out of the way when not in use.

Figure 2:
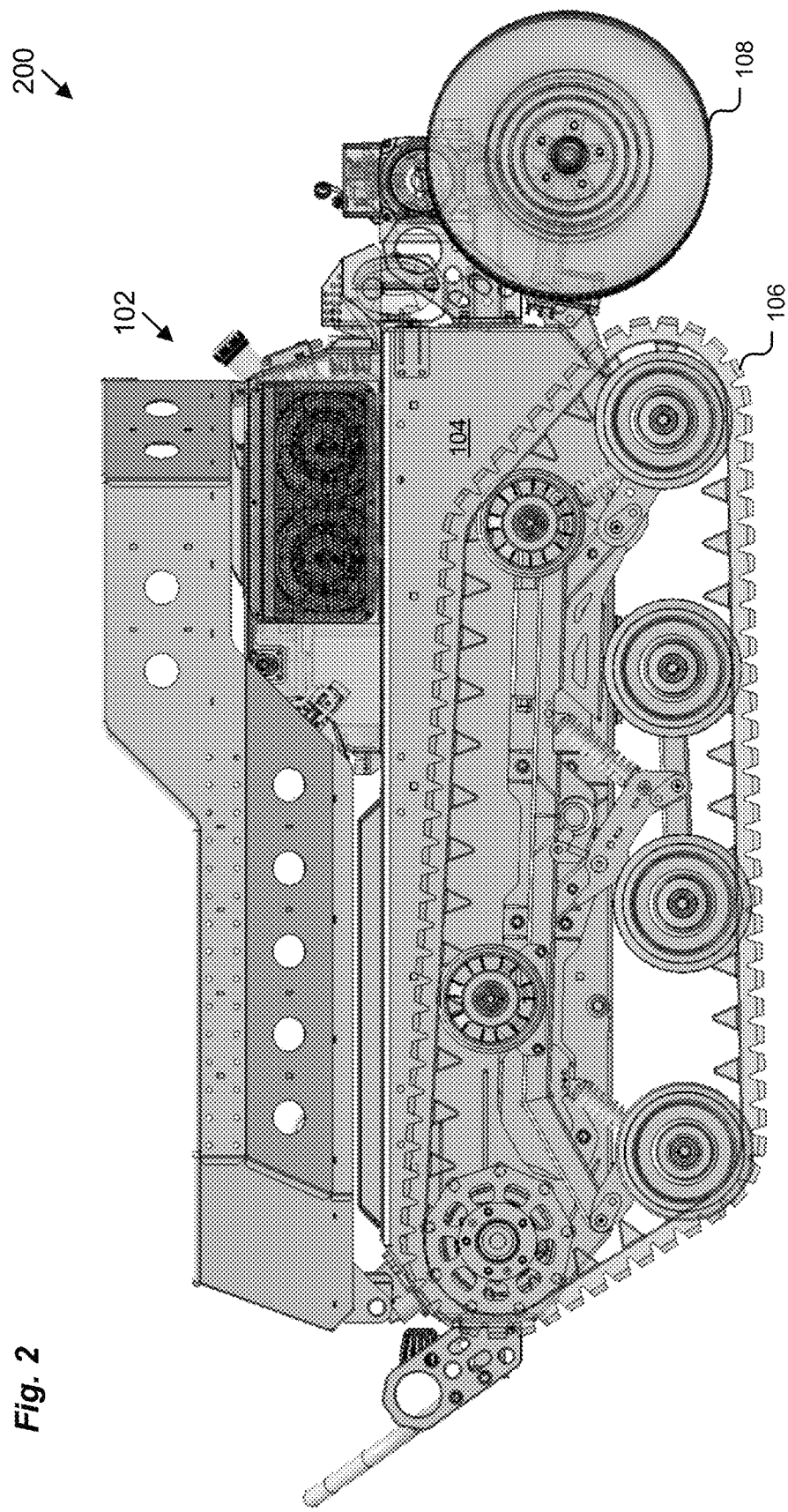
FIG. 2 depicts a view of an example tracked vehicle with a rear wheel in a support configuration for use in connection with various embodiments.

FIG. 2 depicts another view 200 of the example tracked vehicle 102 with the wheels 108 in a lowered ground support configuration at the rear of the vehicle 102. In this configuration the wheels 108 extend the effective length of the track 106 and provide the vehicle with additional stability.

FIGS. 3A-3B depict additional views 300, 300', respectively, of a rear corner of the vehicle 102 while in the rear storage configuration.

As shown, wheel 108 is mounted on an axle 110 that allows the wheel to rotate around the axle 110. Axle 110 is mounted on an offset arm 112, which is coupled to the vehicle body 104. Axle 110 is mounted substantially perpendicular to the arm 112. The term "substantially perpendicular" means approximately perpendicular, such as within 10 degrees of perpendicular. A mounting bracket 114 is mounted at one end of the arm 112 adjacent to the axle 110.

This mounting bracket 114 may be affixed to another mounting bracket 116 mounted on the vehicle body 104. For example, a retaining pin 140 may be placed through a hole 115 on mounting bracket 114 and another hole 117 on mounting bracket 116. Retaining pin 140 may be removed from holes 115, 117 by sliding it upwards in direction 142. Various types of retaining pins 140 may be used, such as, for example, a hitch pin, a cotter pin, and so forth. In some embodiments, other affixation mechanism may be used in place of a retaining pin 140.

As depicted, a shaft 134 protrudes (see also FIGS. 8 and 15*c*) substantially perpendicular to the arm 112 and substantially parallel (e.g., within 10 degrees of parallel) to the axle 110 (but offset from the axle 110 by about the length of the arm 112). A bracing bracket 118 is affixed to the vehicle body 104 near a tube 122, which is configured to receive the shaft 134. A peg 120 also protrudes from the bracing bracket 118 substantially parallel to the shaft 134 and fits into one or more depressions 128, 130 (see view 500 of FIG. 5) in the body 104 to keep the arm 112 in place. Through mounting hardware at both ends of the arm 112, the wheel 108 is affixed solidly to the vehicle body 104.

Figure 7:
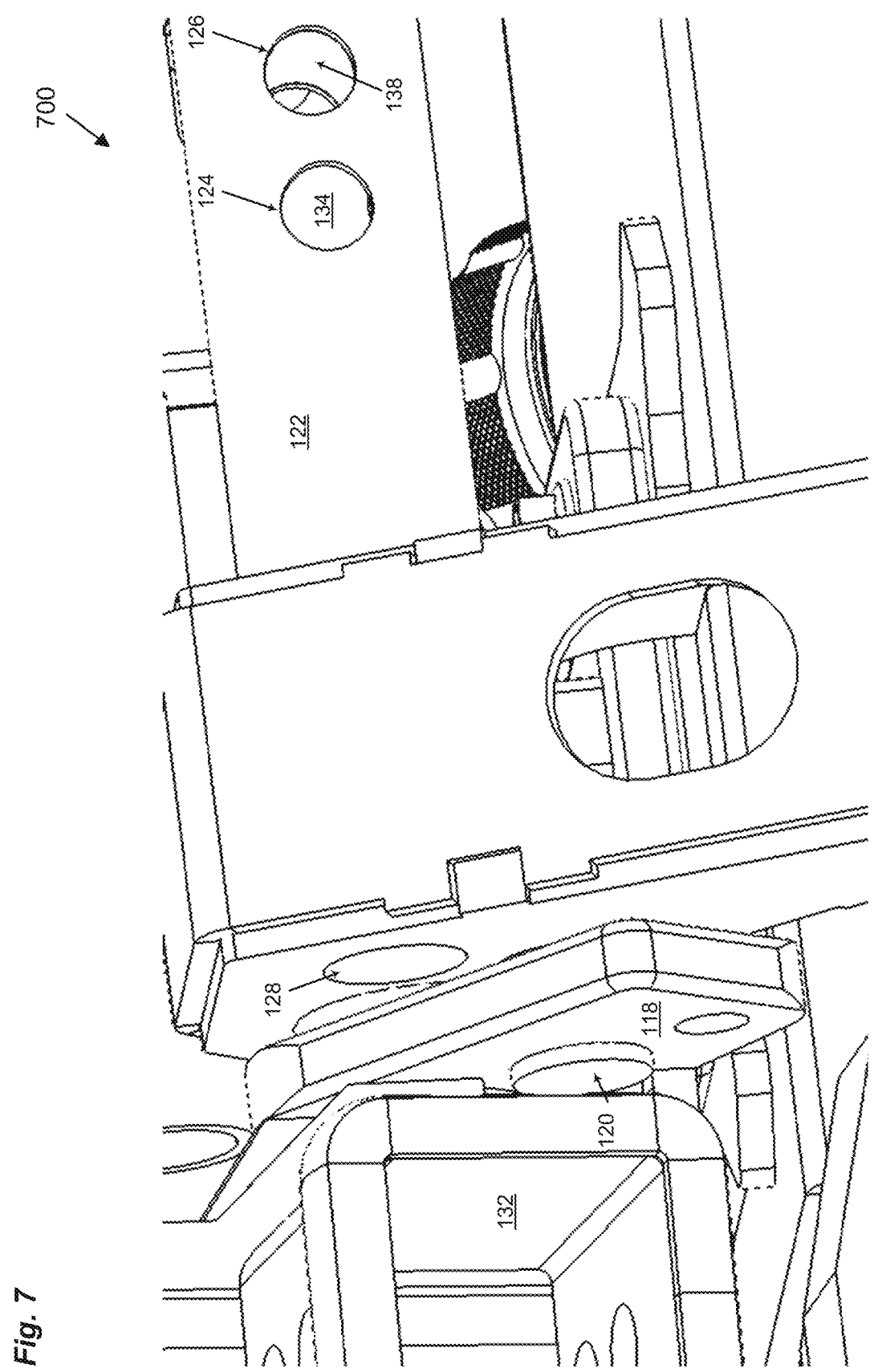
FIG. 7 depicts another view of an example tracked vehicle with its rear wheel in the support configuration for use in connection with various embodiments.

FIGS. 4A-4B depict additional views 400, 400', respectively, of the same rear corner of the vehicle 102 while in an extended ground support configuration. Wheel 108 has been tilted backwards by separating brackets 114, 116 and rotating arm 112 around the shaft 134 towards the rear of the vehicle 102. As can be seen in view 700 of FIG. 7, a hole 138 through shaft 134 has become exposed through hole 126 in tube 122, while nearby hole 124 of tube 122 reveals the shaft 134 underneath. In view 700 of FIG. 7, peg 120 has been inserted into depression 130 (not visible in FIG. 7). A retaining pin (e.g., retaining pin 140) can then be inserted through holes 126, 138 to prevent the shaft 134 from sliding within tube 122, locking the wheel 108 into place in the ground support configuration.

Figure 6:
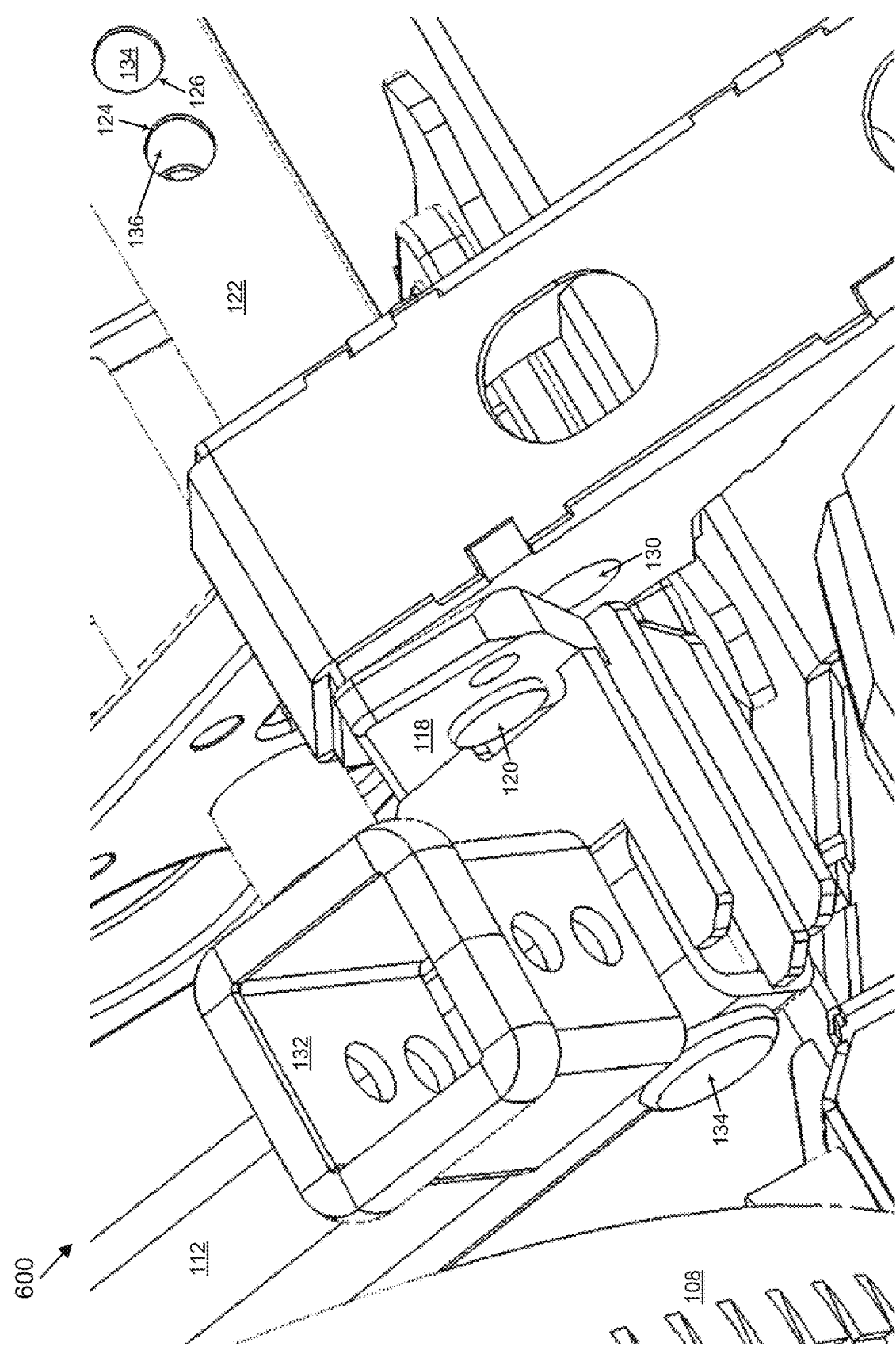
FIG. 6 depicts another view of an example tracked vehicle with its rear wheel in the storage configuration for use in connection with various embodiments.

FIG. 6 depicts a view 600, which is similar to view 700 except that the wheel 108 has not been rotated into the ground support configuration, but rather remains in the storage configuration of FIGS. 1, 3A, and 3B. In view 600, peg 120 has been inserted into depression 128 (not visible in FIG. 7) rather than depression 130. In addition, another hole 136 through shaft 134 has become exposed through hole 124 in tube 122, while hole 126 of tube 122 reveals the shaft 134 underneath. In some embodiments, a retaining pin (e.g., similar to retaining pin 140) may be inserted through holes 126, 136 to prevent the shaft 134 from sliding within tube 122, locking the wheel 108 into place in the storage configuration. In other embodiments, no retaining pin is used through shaft 134 and tube 122 when in the storage configuration. In these embodiments, after removal of the retaining pin 140 from holes 115, 117 and rotation of the arm 112 to tilt the wheel 108 into the ground support configuration, retaining pin 140 may be inserted into holes 126, 138.

Figure 8:
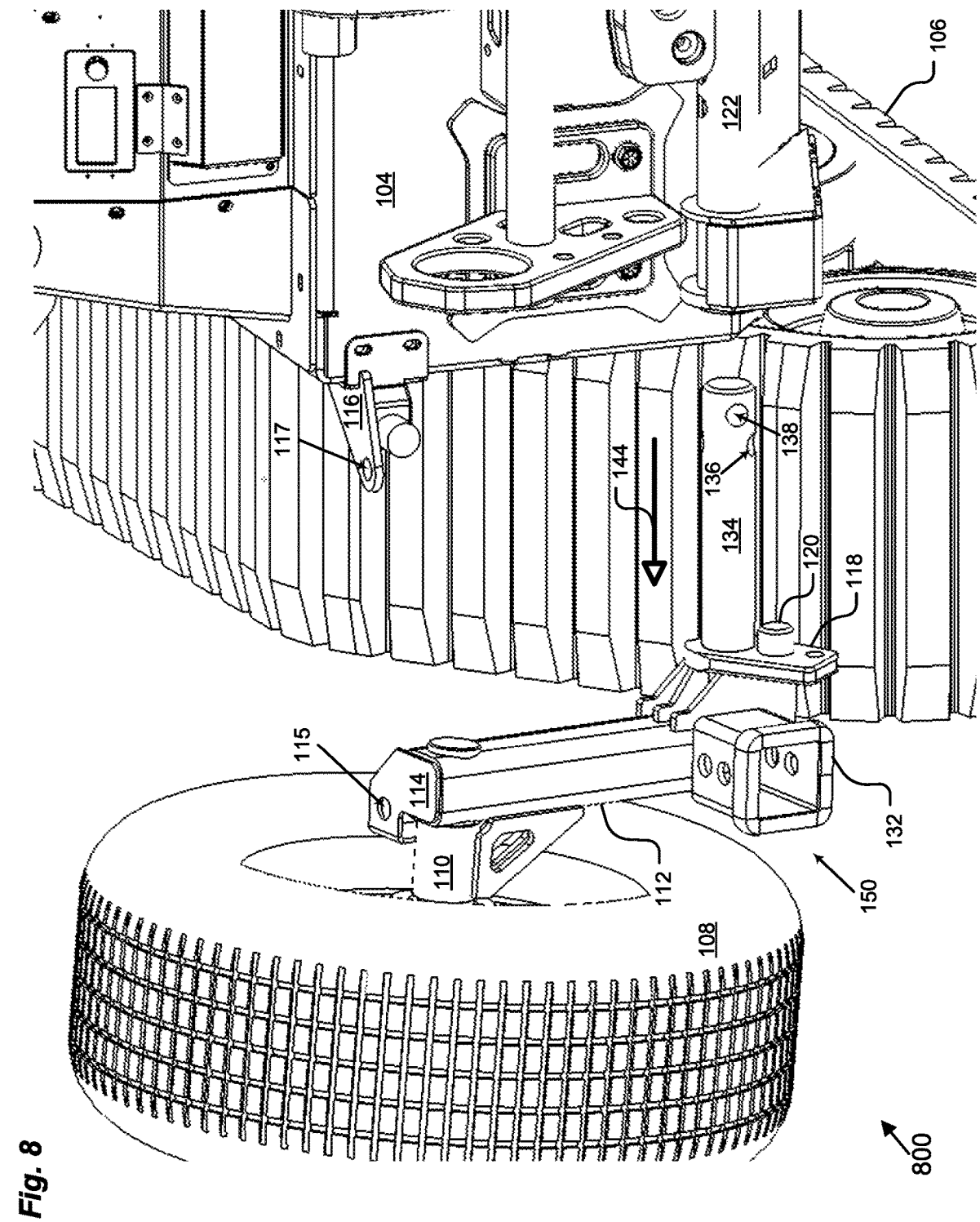
FIG. 8 depicts a view of an example tracked vehicle while a wheel assembly initially in a storage configuration is being removed therefrom.

FIG. 8 illustrates the removal of a wheel assembly 150 from the storage configuration according to various embodiments. As shown, wheel assembly 150 includes wheel 108, axle 110, mounting bracket 114 (and its hole 115), arm 112, bracing bracket 118, and peg 120. Wheel assembly 150 also includes a leverage receiver 132, mounted substantially perpendicular to both the arm 112 and the axle 110 and adjacent to the bracing bracket 118. In view 800, retaining pin 140 (not depicted in FIG. 8, but seen in FIG. 3A) has been removed from holes 115, 117 by sliding it upwards in direction 142 (see FIG. 3A), and wheel assembly 150 has been pulled away from body 104 by sliding in direction 144. If the wheel assembly 150 is to be rotated so that the wheel 108 is in the ground support configuration, then wheel assembly 150 is typically not slid as far along direction 144 as depicted in FIG. 8. Rather, after retaining pins have been removed, it is typically slid along direction 144 just enough for the peg 120 to clear depression 128. After that is done, the wheel assembly 150 is free to rotate back to the ground support configuration. Then wheel assembly 150 may be slid opposite direction 144 to place peg 120 into depression 130, bracing it into place until the retaining pin 140 is inserted through holes 126, 138, locking the wheel assembly 150 into the ground support configuration.

It should be understood that although only two depressions 128, 130 have been depicted (associated with the storage configuration and the ground support configuration, respectively) and only two holes 124, 126 in tube 122 have been depicted (associated with holes 136, 138, in shaft 134 respectively), additional depressions and holes may also be used to enable additional configurations. Thus, for example, if an additional depression were placed in between depressions 128 and 130 (as well as a corresponding set of holes in shaft 134 and tube 122), then it may be possible to lock the wheel assembly 150 into another configuration in between the storage configuration and the ground support configuration. Similarly, if an additional depression were placed past depression 130 (as well as a corresponding set of holes in shaft 134 and tube 122), then it may be possible to lock the wheel assembly 150 into another configuration in which wheel 108 is rotated even further back than in the ground support configuration.

Figure 9:
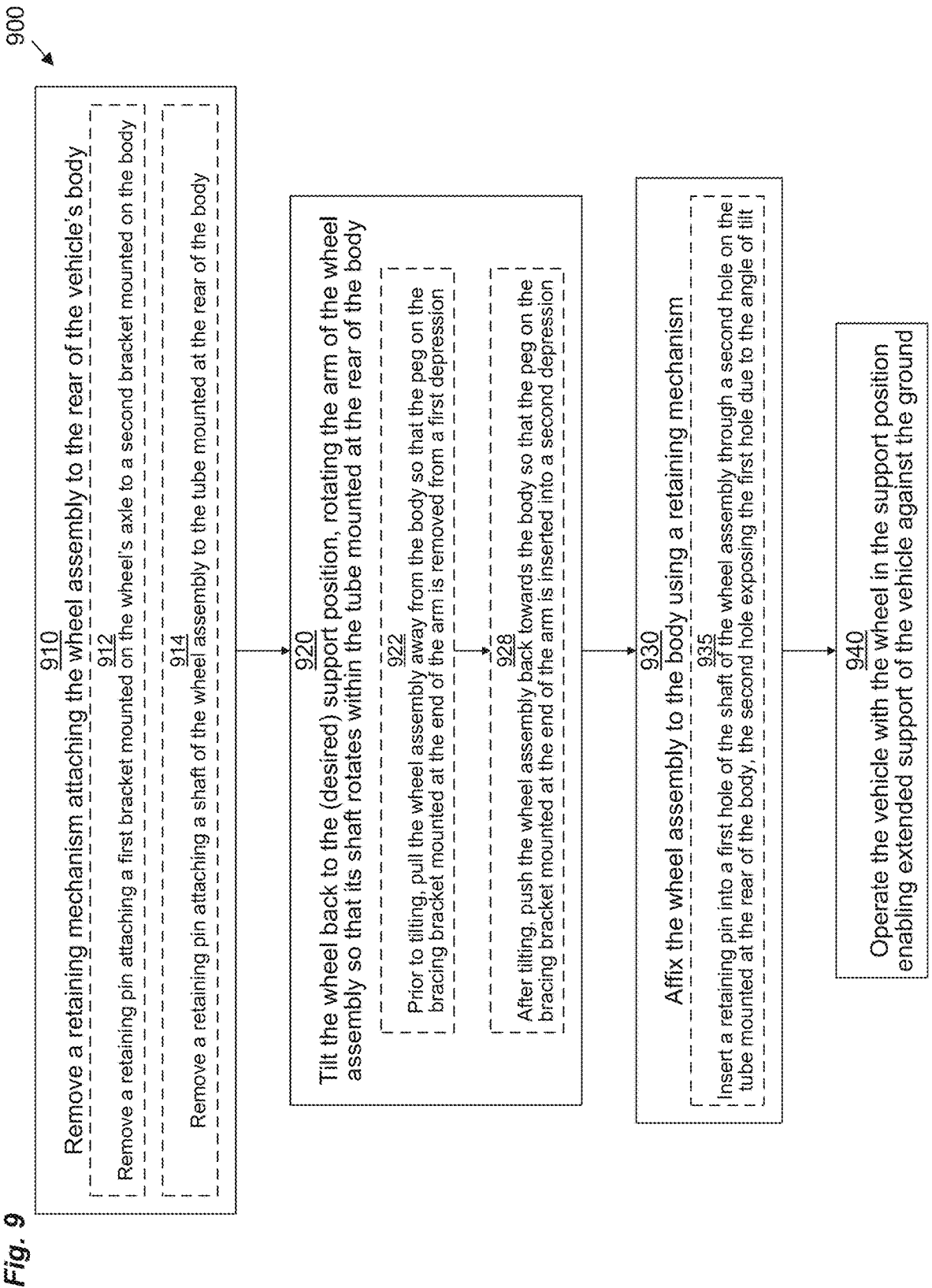
FIG. 9 is a flowchart depicting example methods of reconfiguring a vehicle with a wheel in a storage configuration to instead be in a support configuration.

FIG. 9 illustrates an example method 900 for reconfiguring vehicle 102 from the storage configuration of a wheel 108 (see FIG. 1) to the ground support configuration of that wheel 108 (see FIG. 2). It should be understood that in embodiments in which multiple wheels 108 are used (e.g., one on each side), method 900 may be performed with respect to only one wheel 108 or with respect to more than one of the wheels 108, as desired. It should be understood that one or more of the steps or sub-steps of method 900 may be omitted in some embodiments. Similarly, in some embodiments, one or more steps or sub-steps may be combined together or performed in a different order. Sub-steps marked with dashed lines are optional and/or represent alternative embodiments.

In step 910, an operator removes a retaining mechanism attaching the wheel assembly 150 to the rear of the vehicle body 104. In various embodiments, step 910 may include one or both of sub-steps 912, 914. In other embodiments, another retaining mechanism may be used instead.

In sub-step 912, the operator removes retaining pin 140 attaching a first bracket (e.g., mounting bracket 114) mounted on the axle 110 to a second bracket (e.g., mounting bracket 116) mounted on the body 104, e.g., by sliding retaining pin 140 in direction 142 out of holes 115, 117 (see FIGS. 3A, 3B).

In sub-step 914, the operator removes a retaining pin (not depicted) attaching shaft 134 of the wheel assembly 150 to a tube 122 mounted on the body 104, e.g., by sliding the retaining pin out of holes 124, 136 (see FIG. 6).

Then, in step 920, the operator tilts the wheel 108 back into a desired position (e.g., the ground support configuration) by rotating the arm 112 of the wheel assembly 150 so that its shaft 134 rotates within the tube 122 mounted at the rear of the body 104 (compare FIG. 3A to FIG. 4A). In some embodiments, step 920 may include sub-steps 922 and 928.

Figure 5:
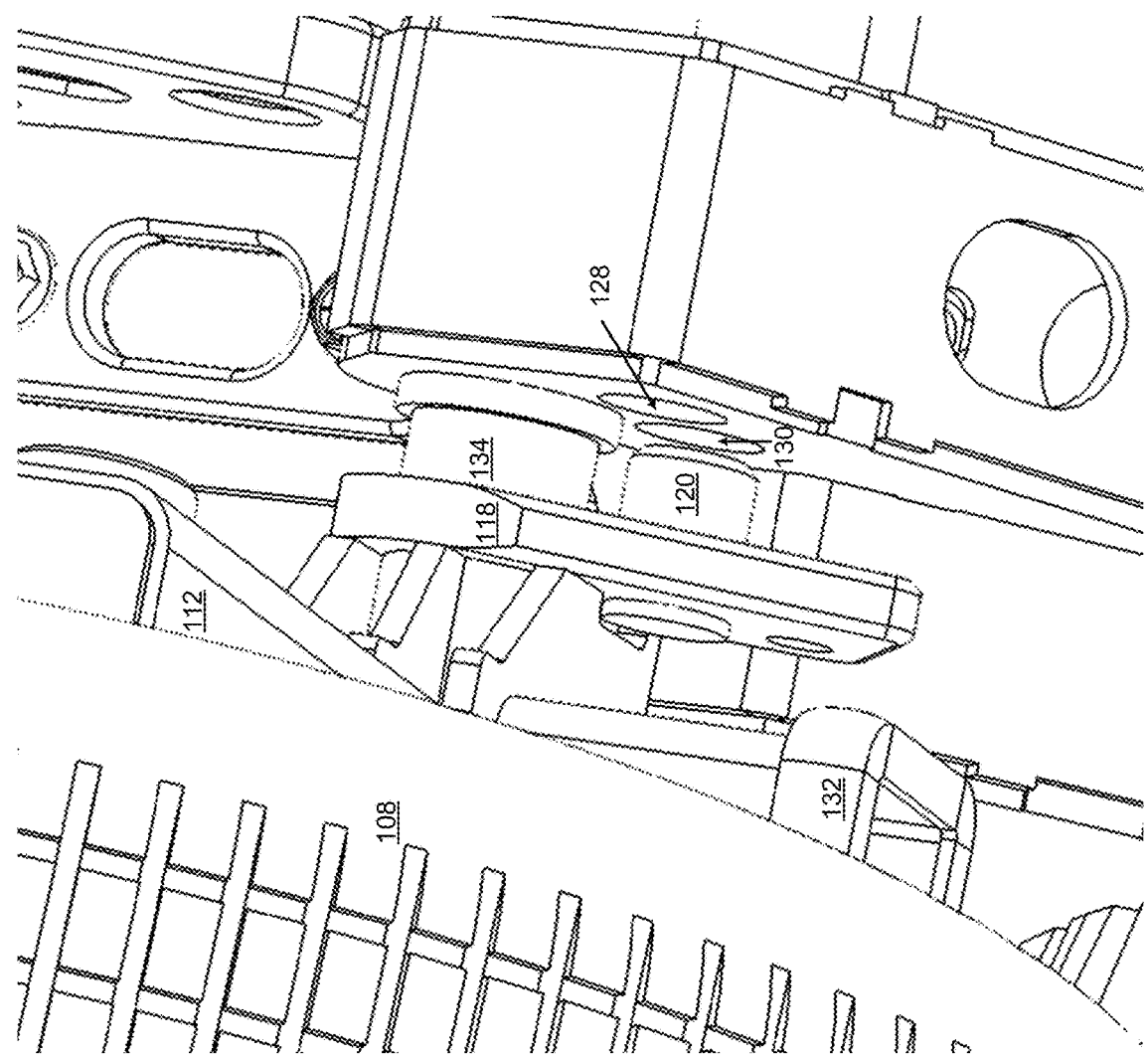
FIG. 5 depicts a view of an example connection between a wheel assembly and a vehicle according to various embodiments.

In sub-step 922, prior to tilting the wheel 108 back, the operator first pulls the wheel assembly 150 away from the body 104 (e.g., in direction 144; see FIG. 8) so that the peg 120 on the bracing bracket 118 is removed from a first depression (e.g., depression 128; see FIGS. 5 and 6). Then, in sub-step 928, after tilting the wheel 108 back, the operator then pushes the wheel assembly 150 back towards the body 104 (e.g., opposite direction 144) so that the peg 120 on the bracing bracket 118 is inserted into a second depression (e.g., depression 130; see FIGS. 5 and 7).

Then, in step 930, the operator affixes the wheel assembly 150 to the body 104 using a retaining mechanism. For example, in some embodiments, step 930 is performed using sub-step 935. In sub-step 935, the operator inserts a retaining pin (e.g., retaining pin 140 that was removed in sub-step 912 or the retaining pin that was removes in sub-step 914) to attach shaft 134 of the wheel assembly 150 to the tube 122, e.g., by sliding the retaining pin into holes 126, 138 (see FIG. 7).

Then, in step 940, the operator may operate the vehicle 102 with the wheel(s) 108 in the ground support configuration, enabling extended support of the vehicle 102 against the ground. In other embodiments, the vehicle 102 is operated with the wheel(s) 108 either further up or further back of the ground support configuration, as desired.

Attention is now drawn to embodiments for towing vehicle 102.

Figure 10:
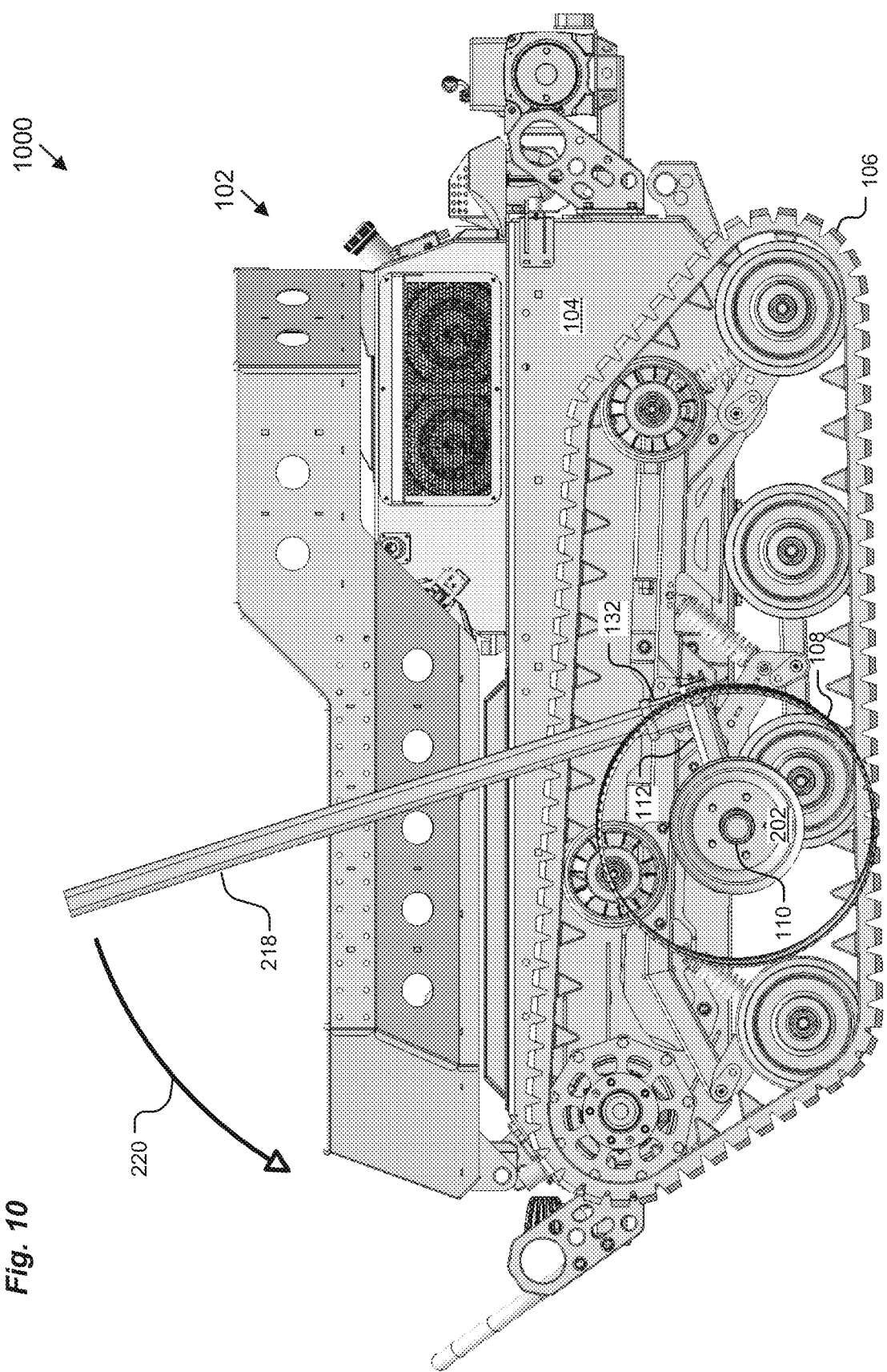
FIG. 10 depicts a view of an example tracked vehicle with a supplemental wheel installed on its side and a lever installed to configure it for use in towing in connection with various embodiments.

FIG. 10 depicts view 1000 respectively, of vehicle 102 in the above-described first position. In some embodiments, wheel assembly 150 may previously have been removed from the rear of the body 104 (see, e.g., FIG. 8) and then slid into a receiver (tube 208; see FIGS. 12A, 12B) mounted in the middle of the body 104. In other embodiments, wheel assembly 150 may have previously been removed from another location on the body 104 or wheel assembly 150 may have not previously been mounted anywhere on the vehicle 102.

As depicted, wheel 108 includes a hub 202 at its center, around axle 110. Wheel assembly 150 may initially be inserted such that the wheel 108 rests on the ground (e.g., at the same level as the bottom of the track 106), or it may be inserted such that wheel 108 is off the ground and then allowed to fall until it hits the ground. In this initial configuration, shaft 134 is inserted into tube 208 with bracing bracket 118 (not visible in FIG. 10; see FIG. 12A) and leverage receiver 132 facing substantially upwards or tilted slightly towards the front of the vehicle 102. As seen in view 1200 of FIG. 12A, in this initial position, bracing bracket 118 is not engaged with U-shaped bracket 210, which is mounted on body 104 forward of the tube 208.

Figure 12A:
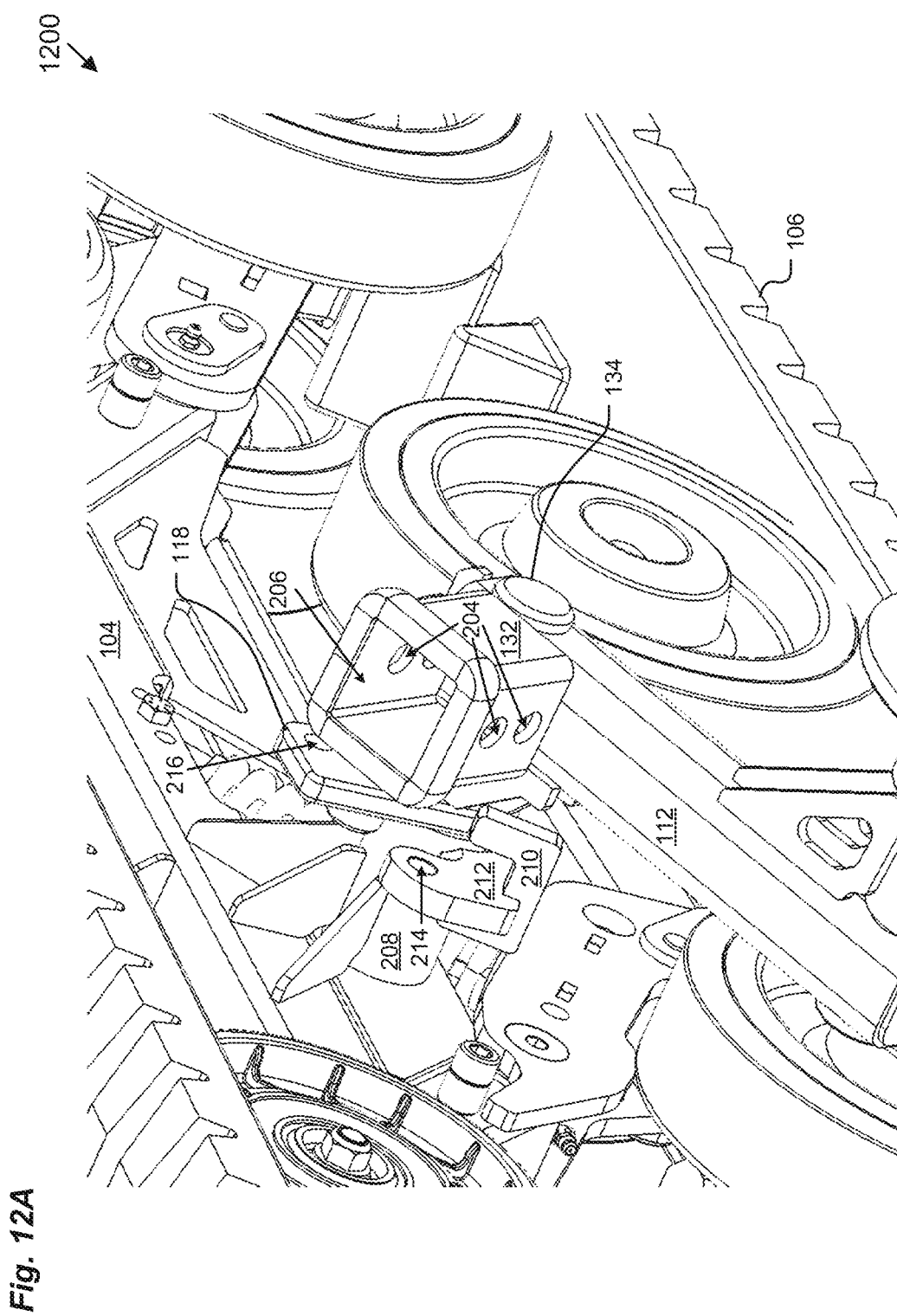
FIGS. 12A-12B depict views of installing a lever on an example tracked vehicle to configure it for use in towing in connection with various embodiments.
Figure 12B:
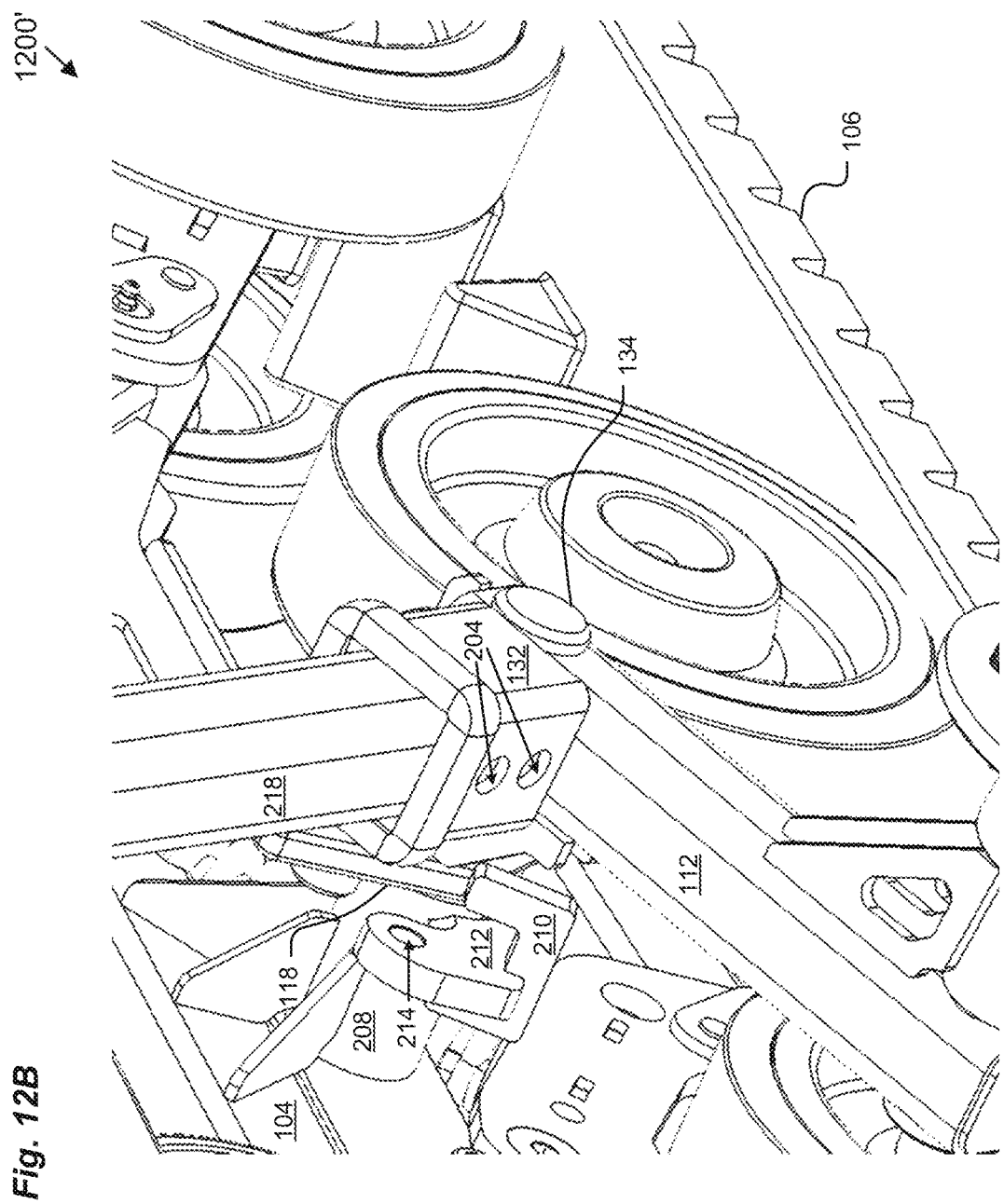
Figure 14:
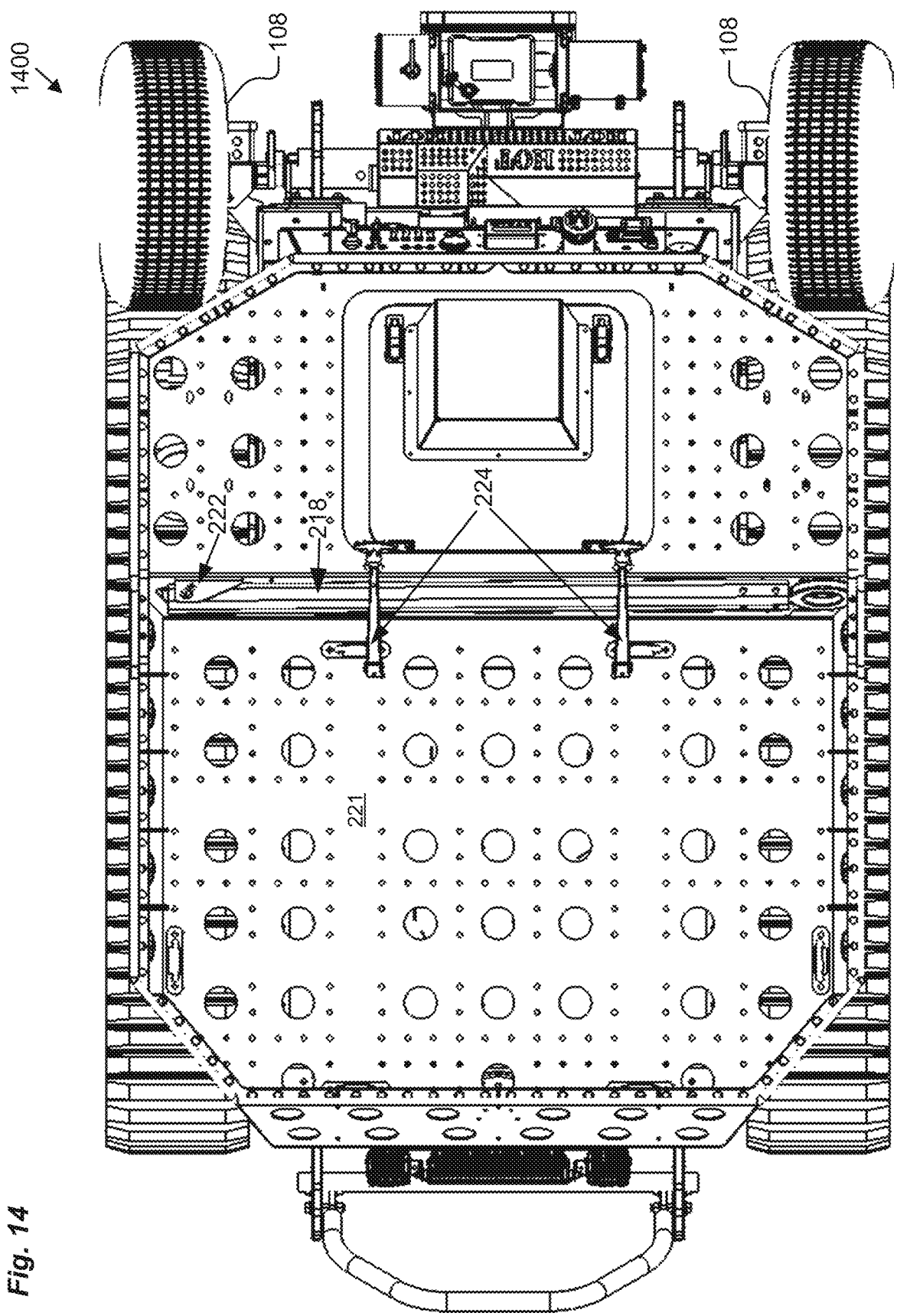
FIG. 14 depicts a view of an example vehicle with a bar for towing and jacking towing wheels in a storage configuration.

It can be seen in view 1200 of FIG. 12A that leverage receiver 132 may include one or more holes 204 that are configured to fit a retaining pin 222 (see FIG. 14). In some embodiments, retaining pin 222 may be similar to retaining pin 140. Leverage receiver 132 also includes a leverage hole 206 configured to receive a lever bar 218 (see view 1200' of FIG. 12B for a depiction of lever bar 218 inserted into leverage hole 206 of leverage receiver 132). FIG. 12B depicts an example view 1200' of lever bar 218 inserted into the leverage receiver 132 while the wheel assembly 150 is still in the intermediate state of FIG. 10. One or more retaining pins 222 may be inserted through one or more of the holes 204 and one or more holes through the lever bar 218 (not depicted) in order to prevent the lever bar 218 from slipping out of leverage hole 206 during leverage operation.

FIG. 10 also illustrates an example process of operating the lever bar 218 to configure an example tracked vehicle 102 for towing in connection with various embodiments. In view 1000 of FIG. 10, operator rotates the lever bar 218 along direction 220 of rotation. This results in lever action causing the vehicle 102 to be jacked up onto wheel 108 and off of track 106 as depicted in view 1100 of FIG. 11. In view 1100, the lever bar 218 has been rotated in direction 220 to a new position facing substantially towards the front of vehicle 102. View 1100 (FIG. 11) depicts wheel assembly 150 in the second position, which provides a towing configuration.

Figure 13A:
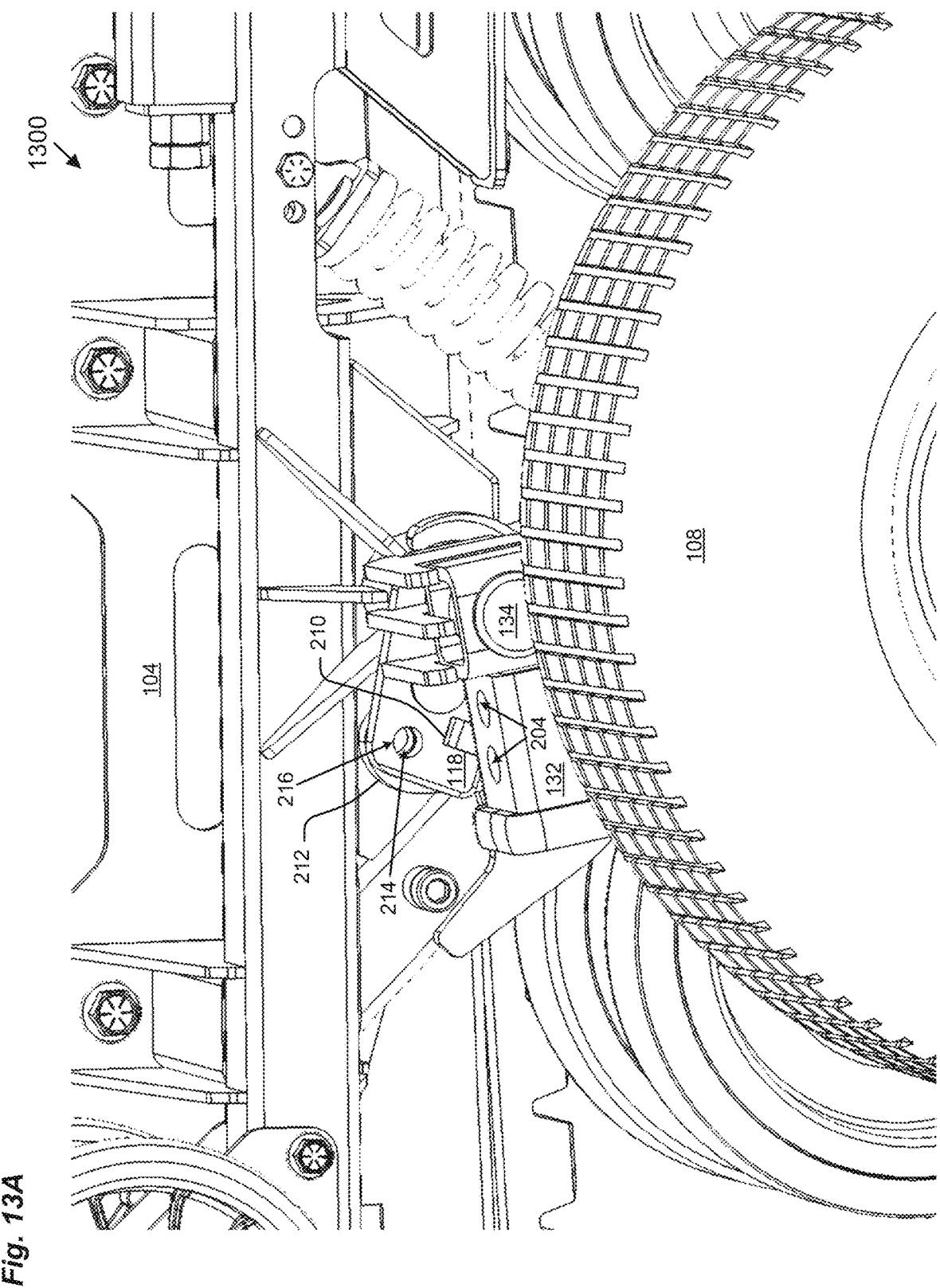
FIGS. 13A-13B depict views of an example tracked vehicle with a supplemental wheel that has been configured for use in towing in connection with various embodiments.
Figure 13B:
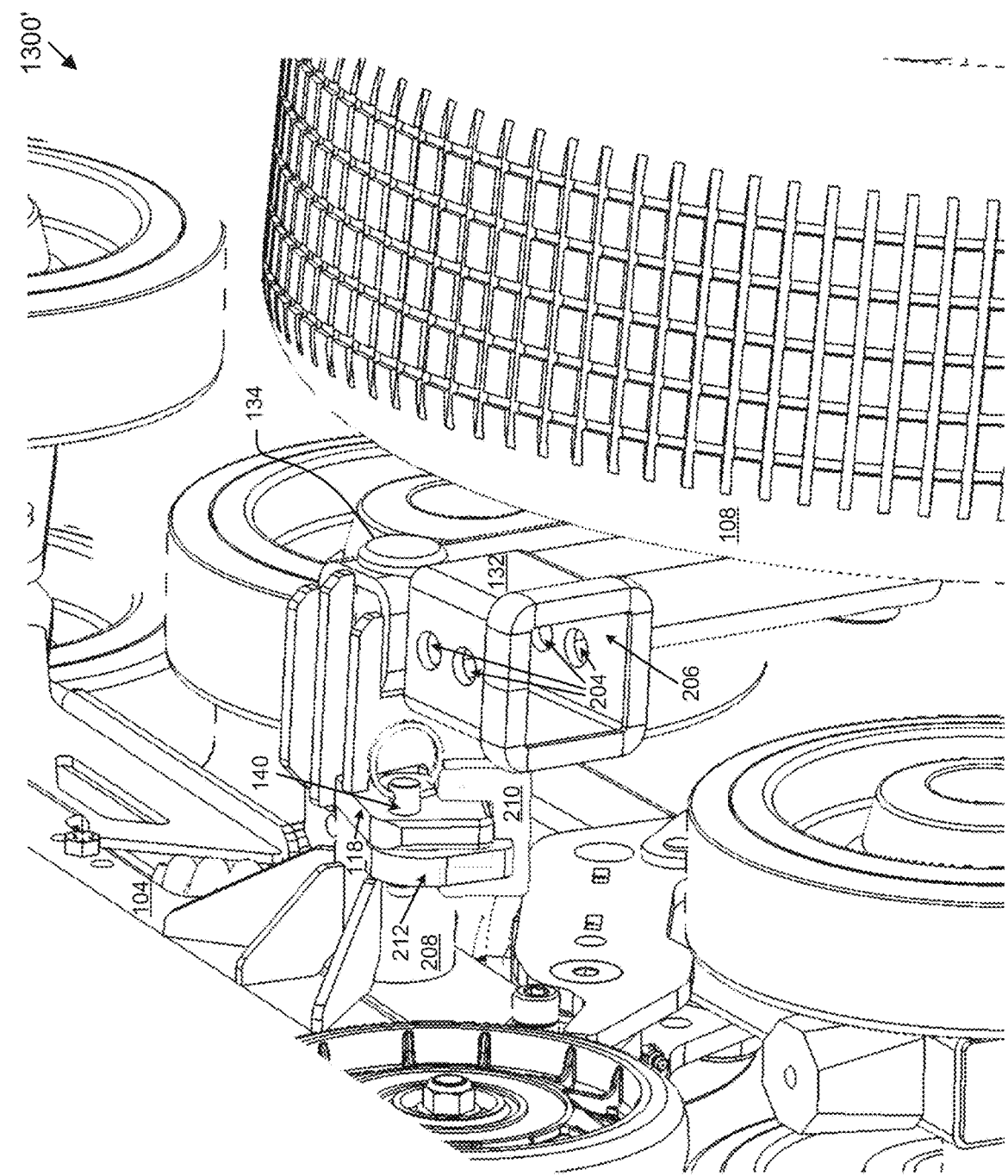

FIGS. 13A, 13B depict views 1300, 1300' respectively, of vehicle 102 in an example towing configuration (e.g., after view 1100) for use in towing in connection with various embodiments. In this configuration, bracing bracket 118 has moved forward until it has been fully inserted into U-shaped bracket 210. In this configuration, a hole 216 on bracing bracket 118 is lined up with another hole 214 on a mounting bracket 212 that is mounted on body 104 near the U-shaped bracket 210. Thus, as depicted in view 1300' of FIG. 13B, a retaining pin 140 may be inserted through holes 214, 216 to lock the wheel assembly 150 into place during towing.

Figure 11:
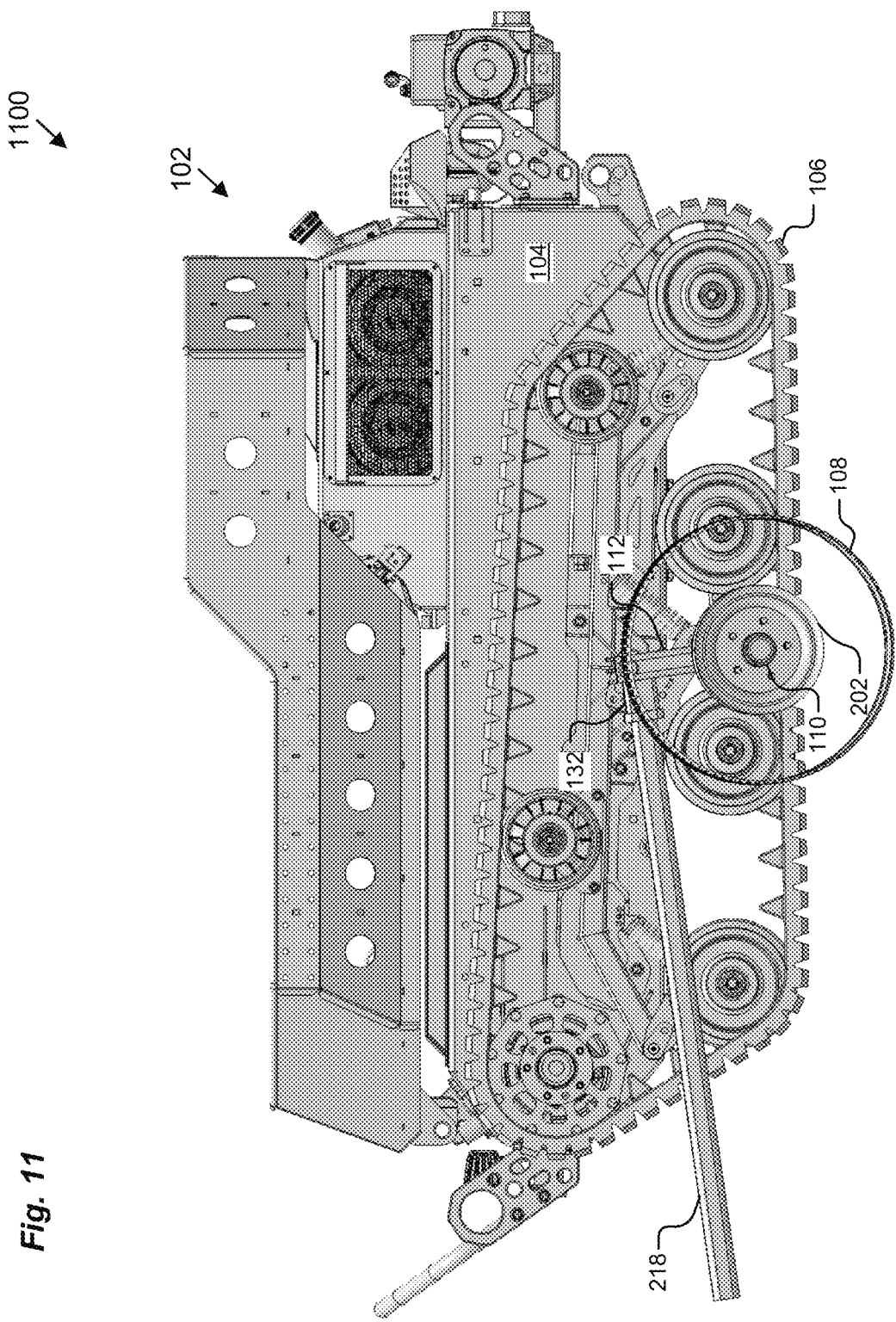
FIG. 11 depicts a view of an example tracked vehicle with a supplemental wheel that has been configured for use in towing by operation of a lever in connection with various embodiments.

In some embodiments (see, e.g., FIG. 11), when in the towing configuration, arm 112 has extended backwards slightly past a vertical configuration (compare FIG. 10 in which arm 112 is close to horizontal and facing forwards with FIG. 11 in which the arm 112 is almost vertical and facing slightly backwards). This configuration is beneficial because once the arm 112 is facing backwards, the weight of the vehicle 102 will tend to keep it in place, so that a single operator is able to let go of the lever bar 218 prior to inserting retaining pin 140 through holes 214, 216 to lock the wheel assembly 150 into place during towing.

FIG. 14 depicts a view 1400 of an example vehicle 102 with a lever bar 218 for both towing and jacking towing wheels 108 in a storage configuration. Lever bar 218 is stored on the top 221 of the vehicle body 104, held in place by one or more straps 224. A retaining pin 222 may also affix the lever bar 218 at one end to the top 221 of the body 104.

Figure 15:
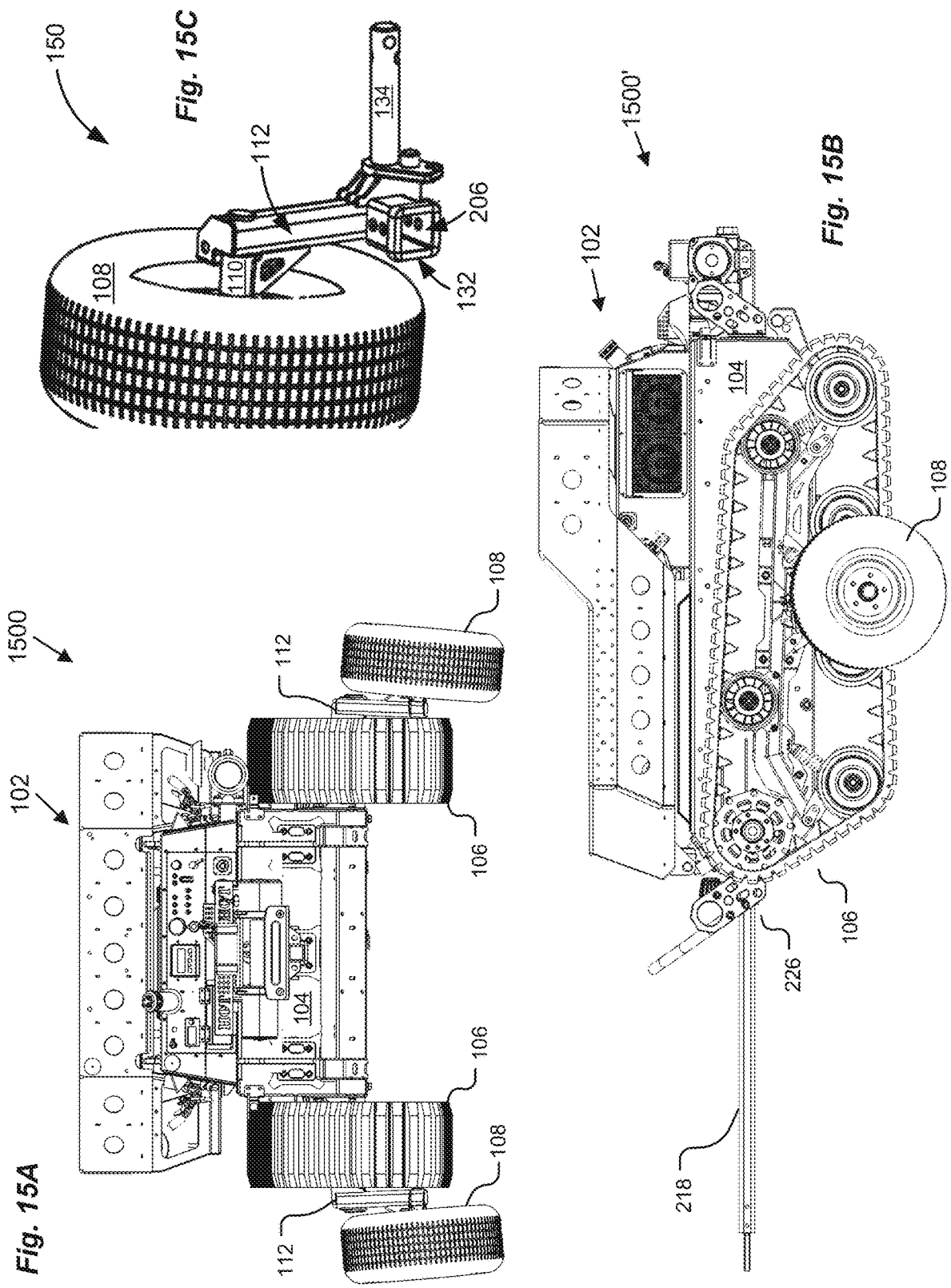
FIGS. 15A-15C depict views of an example tracked vehicle with supplemental wheels that have been configured for use in towing in connection with various embodiments.

FIGS. 15A-15B depict views 1500, 1500', respectively, of an example tracked vehicle 102 with wheels 108 that have been configured for use in towing in connection with various embodiments. FIG. 15C shows an example wheel assembly 150 as already described. View 1500 of FIG. 15A is from the rear of the vehicle 102. It can be seen that a wheel 108 is placed on each side (left and right) of the vehicle 102, and the vehicle 102 is jacked up on the wheels 108 so that the tracks 106 do not make contact with the ground. Thus, the weight of the vehicle is supported by the wheels 108 rather than by the track 106. Arms 112 can also be seen between each wheel 108 and its nearby track 106. As shown, the wheels 108 are not quite parallel to the tracks 106 (i.e., the wheels 108 are not quite perpendicular to the ground). This is because view 1500 has been generated without accounting for the weight of the vehicle 102 against the ground. Thus, as is well-known in the art, the engineering tolerances have been designed such that without a load, the wheels 108 are not quite parallel to the tracks 106 because once the load of the vehicle 102 is applied, the wheels 108 will be pushed out by the weight and then they will be parallel to the tracks 106.

View 1500' of FIG. 15B is a side view of the vehicle 102 again with the vehicle 102 jacked up onto wheels 108 rather than on the tracks 106. In this view 1500' it can be seen that the lever bar 218 has been removed from the leverage receiver 132 and attached to a towing hitch assembly 226 at the front of the vehicle body 104 (e.g., using retaining pin 222, not depicted in FIG. 15B). Lever bar 218 is thus used as a towing connector to attach the vehicle 102 to a towing vehicle (not depicted).

Figure 16:
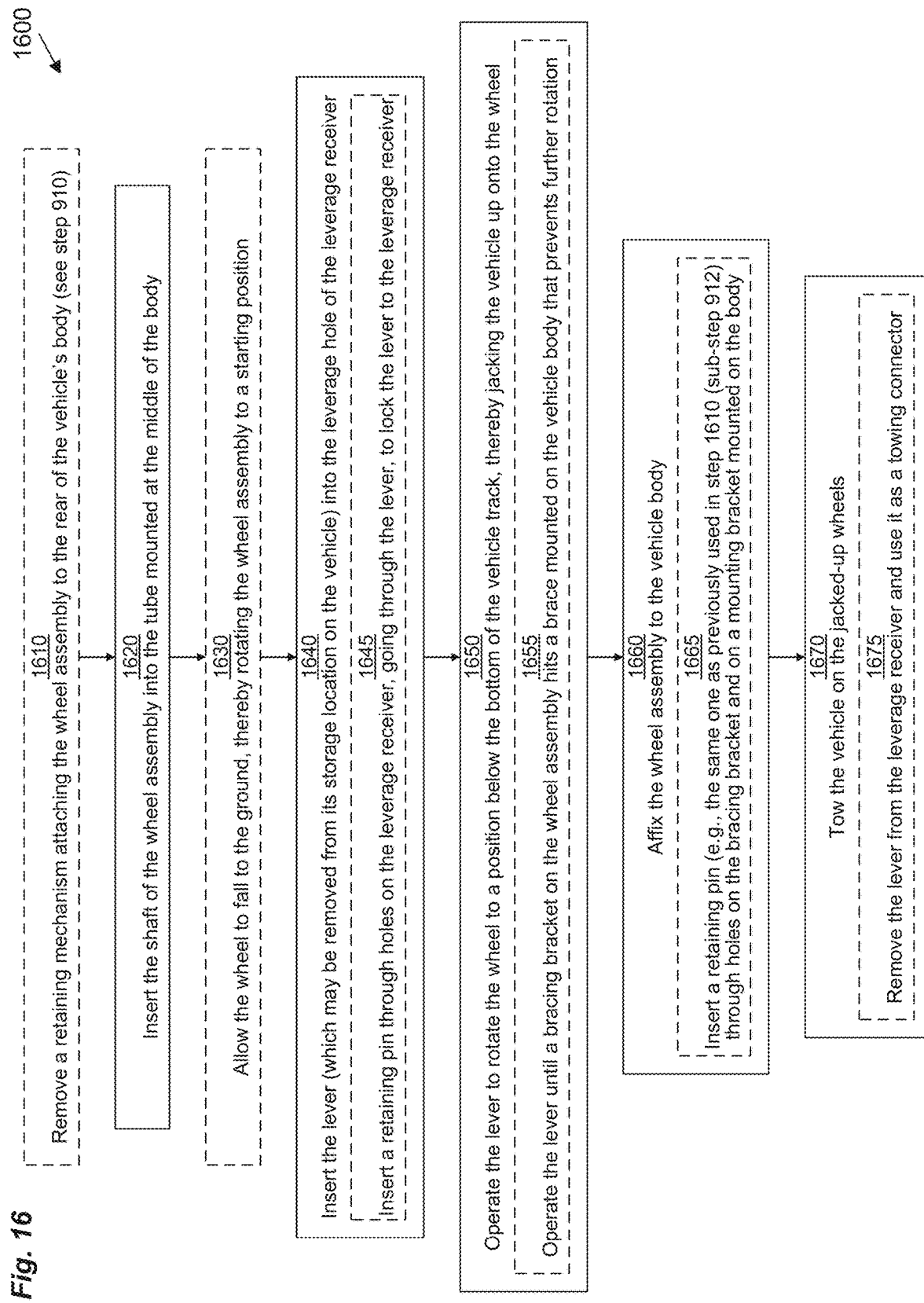
FIG. 16 is a flowchart depicting example methods of reconfiguring a vehicle to use a support wheel for a towing configuration.

FIG. 16 is a flowchart depicting an example method 1600 according to various embodiments of reconfiguring a vehicle 102 use a wheel 108 for towing. It should be understood that in embodiments in which multiple wheels 108 are used, method 1600 is typically performed with respect to two or more of the wheels 108, as desired. It should be understood that one or more of the steps or sub-steps of method 1600 may be omitted in some embodiments. Similarly, in some embodiments, one or more steps or sub-steps may be combined together or performed in a different order. Steps and sub-steps marked with dashed lines are either optional or represent alternative embodiments.

In some embodiments, method 1600 may begin with step 1610. In step 1610, an operator removes a retaining mechanism attaching the wheel assembly 150 to the rear of the vehicle body 104. Step 1610 is similar to step 910, described above in further detail. In addition, as part of step 1610, the operator slides the wheel assembly 150 completely away from the vehicle body 104 in direction 144 as depicted in FIG. 8. In other embodiments, step 1610 may be omitted, the wheel assembly 150 being stored at a different location (e.g., elsewhere on the vehicle 102 or entirely off the vehicle).

In step 1620, the operator inserts (e.g., opposite direction 144) the shaft 134 of the wheel assembly 150 into the tube 208 mounted at the middle of the body 104.

Then, in step 1630, the operator allows the wheel 108 to fall to the ground, thereby rotating the wheel assembly 150 into an initial position (see e.g., FIG. 10). In some embodiments step 1630 may be omitted either because the wheel assembly 150 was initially inserted exactly at the initial position or because the leverage operation may begin with the wheel 108 off of the ground.

Then, in step 1640, the operator inserts the lever bar 218 (which may have been removed from its storage location on the top 221 of the body 104, see FIG. 14) into the leverage hole 206 of the leverage receiver 132. See FIG. 12B. In some embodiments, as part of step 1640, operator also performs sub-step 1645 in which one or more retaining pins 222 is inserted through holes 204 of the leverage receiver 132 as well as through a hole (not depicted) through the lever bar 218. Sub-step 1645 is a safety precaution to prevent the lever bar 218 from falling out of the leverage hole 206 during step 1650.

Then, in step 1650, the operator operates the lever bar 218 to rotate the wheel 108 along direction 220 (see FIG. 10) to a position below the bottom of the vehicle track 106, thereby jacking the vehicle 102 up onto the wheel 108 instead of the vehicle 102 resting on the track 106 as before. In some embodiments, step 1650 may be accomplished via sub-step 1655 in which the operator operates the lever bar 218 until a bracing bracket 118 on the wheel assembly 150 hits a bracket 210 mounted on the body 104 that prevents further forward rotation (see FIG. 13B).

Then, in step 1660, the operator affixes the wheel assembly 150 to the body 104. In some embodiments, step 1660 may be accomplished via sub-step 1665 in which the operator inserts a retaining pin (e.g., the same retaining pin 140 as previously used in step 1610 (see sub-step 912 from method 900)) through holes 214, 216 on the bracing bracket 118 and on mounting bracket 212, respectively (see FIGS. 13A, 13B).

Then, in step 1670, the operator may tow the vehicle 102 on the jacked-up wheels 108 (see FIGS. 15A, 15B). In some embodiments, step 1670 includes sub-step 1675 in which the operator first removes the lever bar 218 from the leverage receiver 132 and uses it as a towing connector by hitching the lever bar 218 to the towing hitch assembly 226 (see FIG. 15B).

Thus, example apparatuses and techniques have been presented for towing tracked vehicles (e.g., vehicles 102) without the noted deficiencies of high-speed and/or long-distance usage. This may be accomplished by configuring these vehicles 102 to be used with towing wheels 108 which may easily be installed while jacking up the vehicle 102 off its track 106 using a wheel assembly 150. In some embodiments, a single operator may configure the vehicle 102 for towing using a lever system (e.g., using lever bar 218). In some embodiments, the towing wheels 108 may be stored elsewhere (e.g., at the rear, see FIG. 1) on the vehicle 102 for easy access. In some embodiments, the lever bar 218 may be stored on the vehicle 102 for easy access (e.g., at the top 221, see FIG. 14). In some embodiments, the lever bar 218 may also be used as a towing connector (see, e.g., FIG. 15B). Advantageously, the various embodiments provided allow the vehicle 102 to be easily configured for raised towing.

In addition, example apparatuses and techniques have been presented for allowing a vehicle (e.g., vehicles 102) to be configured to extend supplemental wheels 108 from a storage configuration (see, e.g., FIGS. 1, 3A, 3B) to a ground support configuration (see, e.g., FIGS. 2, 4A, 4B) in which the vehicle 102 is able to make use of the supplemental wheels 108 for additional ground support. This may be accomplished by using a wheel assembly 150 that is able to rotate a supplemental wheel 108 from a storage position into a usage position with locks in both (or multiple) positions (see, e.g., FIGS. 3A-4B and 6-7). In some embodiments, a single wheel assembly 150 may be used to allow a single storage configuration (see, e.g., FIGS. 1, 3A, 3B) to be reconfigured for both extended ground support (see, e.g., FIGS. 2, 4A, 4B) and towing (see, e.g., FIGS. 13A-13B and 15A-15B), depending on the situation.

Section II: Example Suspension System

Section II describes an example suspension system that may be used when towing a tracked vehicle on one or more wheels. The technique disclosed in this section may be used in connection with the deployable towing wheels of Section I, but this is not required. For example, the techniques in this section may be used with other types of towing wheels, including those which operate differently from the ones described in Section I.

Although tracked vehicles normally include suspension systems that operate when the vehicles are driven on tracks, such suspension systems are not typically used when tracked vehicles are being towed on wheels rather than on tracks. Although tires may provide some measure of compliance, tires may be insufficient in some cases. For example, bumps encountered when towing can cause excessive strain on components and can transmit large vibrations to the tracked vehicles, making them susceptible to damage. Thus, there is a need for additional suspension when tracked vehicles are being towed on wheels.

To address this need in whole or in part, a disclosed technique provides a suspension assembly for use when a tracked vehicle is being towed on wheels. The suspension assembly operatively connects a towing wheel to a body of the tracked vehicle and reduces vibration when the tracked vehicle is being towed.

In some examples, the towing wheel is part of a wheel assembly and the suspension assembly is configured to enable vertical movement of the wheel assembly relative to the vehicle body. The suspension assembly includes a suspension arm having a first portion coupled to the vehicle body and a second portion coupled to the wheel assembly. The second portion is configured to move through a suspension travel.

In some examples, the suspension assembly includes a suspension travel stop configured to limit the suspension travel.

In some examples, the first portion of the suspension arm is coupled to the vehicle body via a pivot joint, such as a receiver or tube.

In some examples, the suspension assembly further includes a suspension spring operatively connected between the suspension arm and the vehicle body. The suspension spring may be composed at least partially of rubber. For example, the suspension spring may be provided as a rubber bellows spring that provides both compression and damping.

In accordance with some aspects, a tracked vehicle is provided which includes a vehicle body, a track coupled to the vehicle body, a suspension assembly, and a wheel assembly coupled to the vehicle body via the suspension assembly. The wheel assembly includes a wheel and is operable to assume a towing position in which at least a portion of the wheel extends below the track and enables the tracked vehicle to be towed on the wheel without the track making ground contact.

In some examples, the wheel assembly includes an axle about which the wheel is able to spin, an offset arm coupled to the axle, and an offset shaft coupled to the offset arm and extending substantially parallel to the axle. The offset shaft is rotatably coupled to the second portion of the suspension arm and enables the wheel to swing into and out of the towing position.

In accordance with other aspects, a tracked vehicle includes a vehicle body, a pair of tracks coupled to the vehicle body, and a plurality of wheel assemblies coupled to the vehicle body via respective suspension assemblies. The plurality of wheel assemblies includes respective wheels operable to extend below the tracks to enable the tracked vehicle to be towed on the wheels without the tracks making ground contact.

Figure 18:
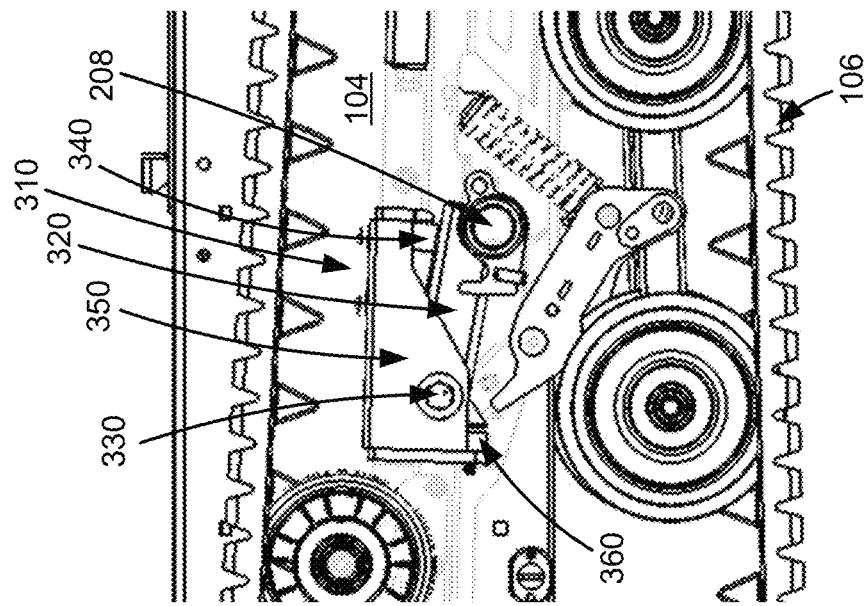
FIG. 18 is a side view of a tracked vehicle with example towing wheel suspension.
Figure 17:
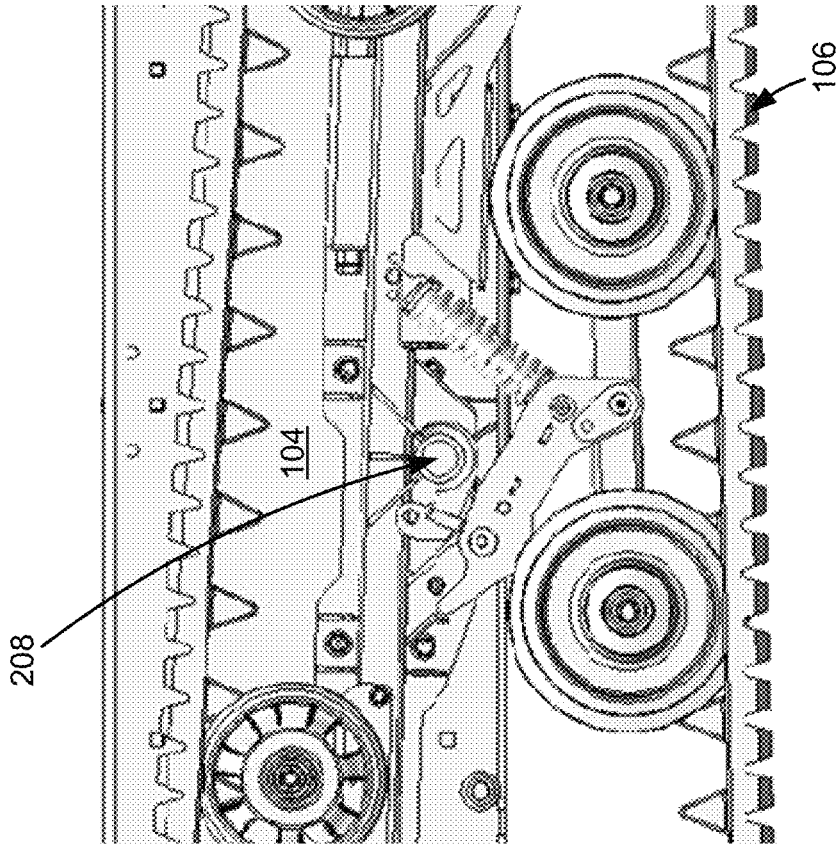
FIG. 17 is a side view of a tracked vehicle without towing wheel suspension and is similar to embodiments described in connection with FIGS. 1-16.

FIG. 18 shows an example suspension system in accordance with improvements hereof. The FIG. 18 example is depicted opposite FIG. 17, which shows the Section-I arrangement, i.e., without towing-wheel suspension. As previously described, the FIG. 17 arrangement includes a tube/receiver 208 mounted to the vehicle body 104. The tube/receiver 208 is configured to receive an offset shaft 134 of a wheel assembly 150 (see, for example, FIG. 15C of Section I). In this arrangement, no suspension is provided when operating the vehicle in the towing configuration (except for that inherently provided by tires). Any bumps experienced by towing wheels 108 are transmitted directly to the vehicle body 104 via the tube 208.

In contrast, the tracked vehicle as shown in FIG. 18 is equipped with an example suspension assembly 310 for use when towing. In the example shown, the suspension assembly 310 includes a suspension arm 320, a pivot joint 330, a suspension spring 340, and a suspension case 350. One should appreciate that the suspension assembly 310 may be separate from any suspension system already provided for use when driving the vehicle on its tracks 106. However, other embodiments are envisioned in which suspension components primarily used for driving on tracks may serve a secondary purpose in providing suspension for towing.

Figure 19:
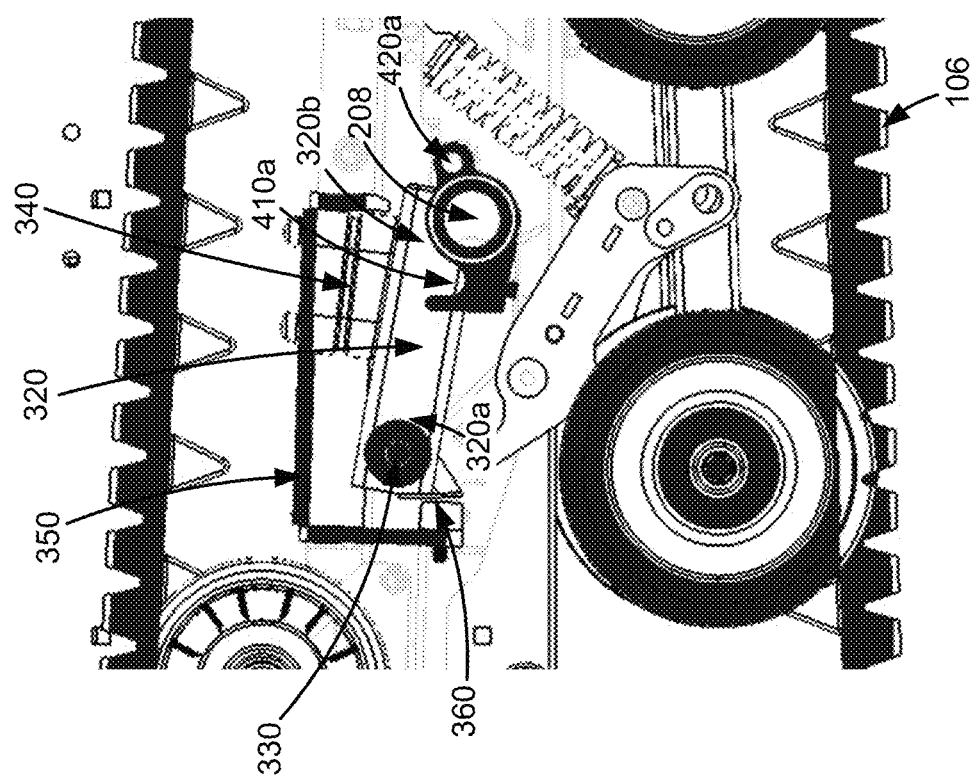
FIG. 19 is a side view similar to FIG. 18, but shows components with a cover of the suspension case partially removed.

As shown in FIGS. 18 and 19, the tube/receiver 208 is provided at a second portion 320b of the suspension arm 320, which also has a first portion 320a at which the pivot joint 330 is located. In this arrangement, the tube/receiver 208 is free to swing up and down on the suspension arm 320 via constrained rotation of the suspension arm 320 about the pivot joint 330. In an example, a range of suspension travel of the tube/receiver 208 is limited from above by a maximum compression of suspension spring 340 between the suspension arm 320 and a horizontal surface attached to or integral with the vehicle body 104, such as a top surface of the suspension housing 350. In an example, the range of suspension travel of the tube/receiver 208 is also limited from below by a suspension stop 360, which prevents the suspension arm 320 from rotating beyond some maximum downward angle, such as between 5 degrees and 20 degrees, for example. As in the FIG. 17 example, the tube/receiver 208 in FIG. 18 is also configured to receive the offset shaft 134 of wheel assembly 150. Thus, instead of the offset shaft 134 being coupled to a tube mounted directly to the vehicle body 104, as in FIG. 17, it is instead coupled to a tube mounted to a suspension arm, which is coupled to the vehicle body 104 via suspension assembly 310.

In an example, the suspension spring 340 provides both elasticity and damping. Non-limiting examples of suitable suspension springs include Aeon® rubber springs available from Timbren Industries of Ontario, Canada. Other forms of suspension springs may be provided, however, including those which provide elasticity and damping separately.

In an example, the suspension housing 350 at least partially encloses the suspension arm 330 and suspension spring 340 and provides some protection against dirt, rocks, and other environmental debris. It may also serve a mechanical role in holding the various components in the positions needed for operation.

As best seen in FIGS. 19 and 20, the suspension assembly 310 includes various features that facilitate use of the wheel assembly 150 in the towing configuration. Also, features of the wheel assembly 150 as shown in Section II may be varied from those shown in Section I to better address design considerations involved when including suspension. For example, suspension arm 320 as shown in FIGS. 19 and 20 includes an over-rotation stop structure 410a, such as a concavity, which is configured to engage with a complementary stop structure, such as a welded-on pin 410b that extends from the wheel assembly 150 (see FIG. 20). The stop structures 410a and 410b perform a similar role to the U-shaped bracket 210 and bracket 212 described in connection with Section I, i.e., they limit the rotation of the wheel assembly 150 when the wheel assembly is being rotated into the towing configuration. As further shown, suspension arm 320 further includes a retaining structure, such as a hole 420a, which is configured to align with a complementary retaining structure of the wheel assembly 150, such as another hole 420b. Once the wheel assembly 150 has been rotated such that the holes 420a and 420b become aligned, a retaining pin 420c may be inserted through both holes to lock the wheel assembly 150 in the towing configuration. In some examples, engagement of the stop structures 410a and 410b holds the wheel assembly 150 at an angle that causes the retaining structures 420a and 420b to align, allowing the pin 420c to be easily inserted.

As shown in FIG. 20, the wheel assembly 150 includes the above-described leverage receiver 132 for receiving lever 218, which may be inserted into leverage hole 206. These features perform the same roles as described in connection with Section I.

Figure 21A:
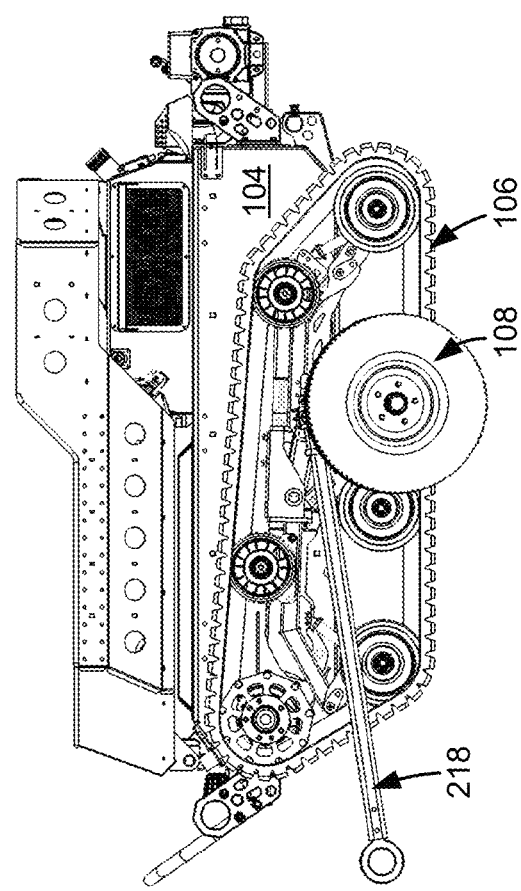
FIGS. 21a and 21b are side views of a tracked vehicle with an example suspension prior to rotation (FIG. 21a) and after rotation (FIG. 21b) into a towing configuration.
Figure 21B:
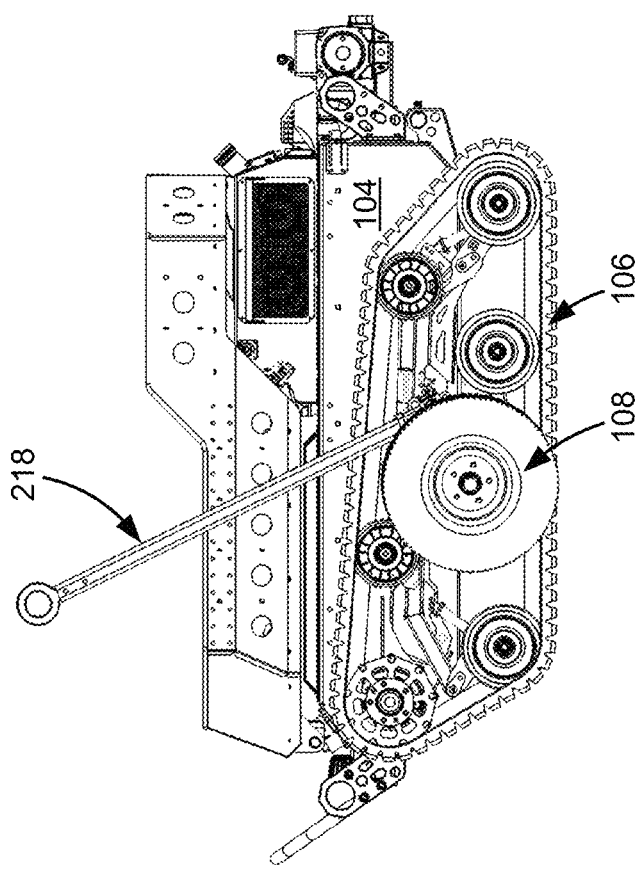

FIGS. 21a and 21b show example operation of the wheel assembly 150 between a first position in which the vehicle rests on its tracks 106 and a second position in which the vehicle rests on towing wheels 108. The operation for rotating the wheel assembly 150 is similar to that described in connection with FIGS. 10 and 11 of Section I, the primary difference being that the wheel assembly in FIGS. 21a and 21b rotates about a tube 208 that rides on suspension assembly 310, rather than rotating about a tube that is connected to the vehicle body 104 without suspension.

Figure 22:
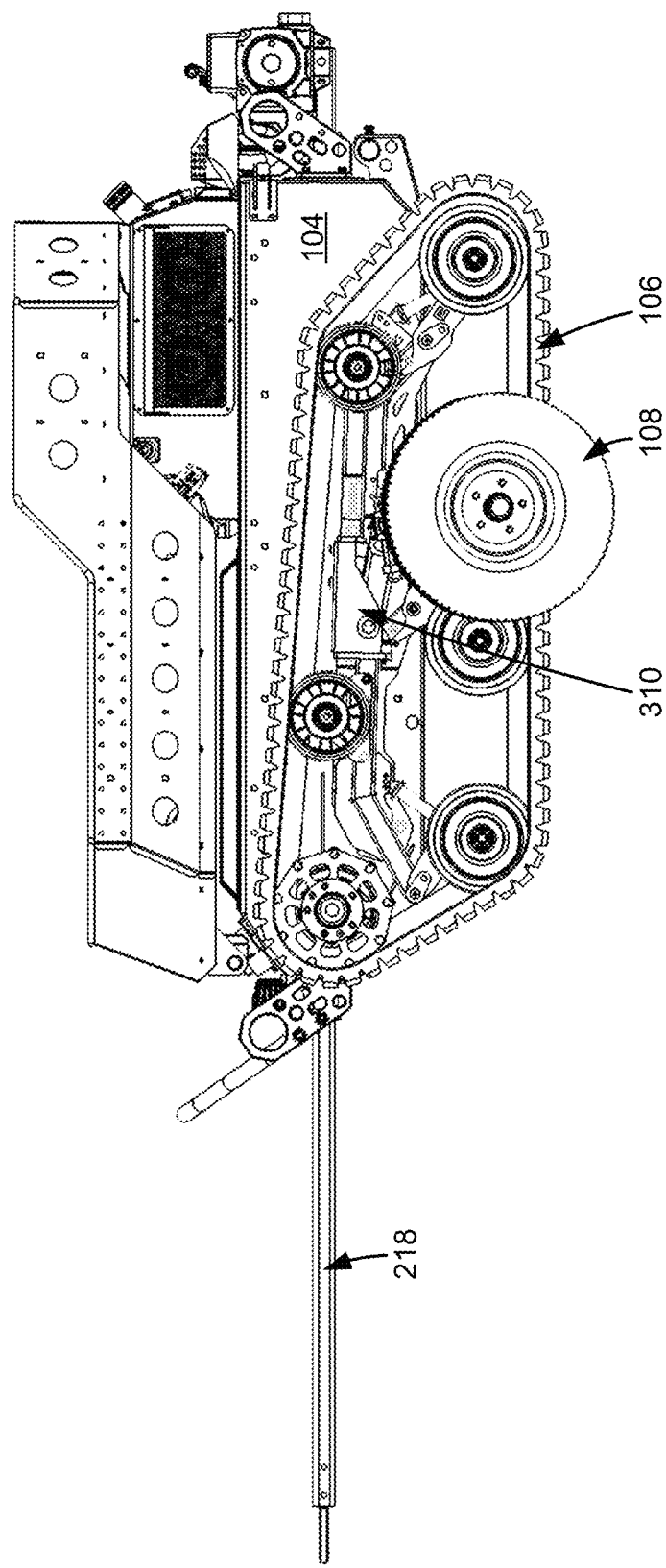
FIG. 22 is a side view of an example tracked vehicle with suspension and with a lever bar used for towing.

FIG. 22 shows an example of the tracked vehicle of Section II in the towing configuration. Here, receiving lever 218 is used as a tow bar, enabling the tracked vehicle to be towed, e.g., by a truck or other vehicle, on the towing wheels 108 with the tracks 106 off the ground and in the air. In this arrangement, the tracked vehicle is towed with the benefit of suspension, such that bumps encountered while towing are absorbed by the suspension and the vehicle is protected from damage caused by excessive vibration.

One should appreciate that the suspension assembly 310 described in connection with Section II need not interfere with the various functions described in connection with Section I. For instance, the wheel assembly 150 described in Section II may be held in a storage configuration, e.g., at the rear of the vehicle 102. It may further be deployed in a configuration that extends the effective track length of the vehicle 102, e.g., with wheels 108 extending behind the tracks at or slightly above ground level. Thus, the suspension assembly 310 and its associated functions may be provided without sacrificing the functionality described in Section I.

An improved technique has been described that provides a suspension assembly for use when a tracked vehicle is being towed on wheels. The suspension assembly operatively connects a towing wheel to a body of the tracked vehicle and reduces vibration when the tracked vehicle is being towed.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

Table of Reference Characters.

| Ref. | Description |
| --- | --- |
| 102 | Vehicle |
| 104 | Body of vehicle 102 |
| 106 | Track of vehicle 102 |
| 108 | Towing/Extension Wheel |
| 110 | Axle of wheel 108 |
| 112 | Offset arm of wheel assembly 150 |
| 114 | Mounting Bracket mounted on axle 110 |
| 115 | Retaining Pin Hole on bracket 114 |
| 116 | Mounting Bracket mounted on body 104 |
| 117 | Retaining Pin Hole on bracket 116 |
| 118 | Bracing Bracket |
| 120 | Peg that braces bracket 118 against body 104 |
| 122 | Tube mounted on body 104 for receiving shaft 134 |
| 124 | Hole on tube 122 for receiving a retaining pin when wheel assembly 150 is in a stored position and hole 136 within shaft 134 is exposed |
| 126 | Hole on tube 122 for receiving a retaining pin when wheel assembly 150 is in a lowered position (for use in extending the support of the vehicle 102) and hole 138 within shaft 134 is exposed |
| 128 | Depression in body 104 for receiving peg 120 when wheel assembly 150 is in a stored position |
| 130 | Depression in body 104 for receiving peg 120 when wheel assembly 150 is in a lowered position (for use in extending the support of the vehicle 102). |
| 132 | Leverage Receiver for receiving lever 218 |
| 134 | Offset shaft of wheel assembly 150 for insertion into vehicle-mounted tubes 122 and 208 |
| 136 | Hole within shaft 134 for receiving a retaining pin when wheel assembly 150 is in a stored position |
| 138 | Hole within shaft 134 for receiving a retaining pin when wheel assembly 150 is in a lowered position (for use in extending the support of the vehicle 102) |
| 140 | Retaining Pin for insertion into holes 115 and 117 (may also be inserted into holes 214 and 216) |
| 142 | Direction of removal of pin 140 from holes 115 and 117 |
| 144 | Direction of removal of wheel assembly 150 from body 104 |
| 150 | Wheel Assembly |
| 202 | Hub of wheel 108 |
| 204 | Holes in leverage receiver 132 for receiving retaining pin(s) 222 |

-continued

Table of Reference Characters.

| Ref. | Description |
|---|---|
| 206 | Leverage Hole in leverage receiver 132 for receiving lever 218 |
| 208 | Tube mounted on body 104 for receiving shaft 134 when in a towing configuration |
| 210 | U-shaped Bracket for bracing against bracing bracket 118 |
| 212 | Mounting Bracket mounted on body 104 for use in a towing configuration |
| 214 | Retaining Pin Hole on bracket 212 |
| 216 | Retaining Pin Hole on bracket 118 |
| 218 | Lever for leveraging wheel assembly 150 into a towing configuration |
| 220 | Direction of rotation of lever 218 for rotating wheel assembly 150 into a towing configuration |
| 221 | Top Surface of body 104 |
| 222 | Retaining Pin for affixing lever 218 to leverage receiver 132 |
| 224 | Rubber Straps for attaching lever 218 to top surface 221 |
| 226 | Towing hitch assembly |
| 310 | Suspension assembly |
| 320 | Suspension arm |
| 320a | First portion of suspension arm 320 |
| 320b | Second portion of suspension arm 320 |
| 330 | Pivot joint for rotatably attaching suspension arm 320 to vehicle body 104 |
| 340 | Suspension spring, such as rubber bellows spring |
| 350 | Suspension case |
| 360 | Suspension travel stop |
| 410a | Stop structure |
| 410b | Complementary stop structure (e.g., over-rotation stop pin) |
| 420a | Retaining structure (e.g., hole in ring) |
| 420b | Complementary retaining structure (e.g., alignment hole) |
| 420c | Retaining pin |

We claim:

1. A tracked vehicle, comprising:
a vehicle body;
a track coupled to the vehicle body;
a suspension assembly; and
a wheel assembly coupled to the vehicle body via the suspension assembly, the wheel assembly including a wheel and being operable to assume a towing position in which at least a portion of the wheel extends below the track to enable the tracked vehicle to be towed on the wheel without the track making ground contact;
wherein the suspension assembly is configured to provide suspension for vertical movement of the wheel relative to the vehicle body; and
wherein the suspension assembly includes a suspension arm and a suspension spring, the suspension arm having a first portion coupled to the vehicle body and a second portion coupled to the wheel assembly, the second portion configured to move vertically through a suspension travel while the wheel assembly is locked in the towing position, the suspension spring operatively coupled between the suspension arm and the vehicle body.

2. The tracked vehicle of claim 1, wherein the suspension assembly further includes a suspension travel stop configured to limit the suspension travel.

3. The tracked vehicle of claim 1, wherein the first portion of the suspension arm is coupled to the vehicle body via a pivot joint.

4. The tracked vehicle of claim 1, wherein the suspension spring is composed at least partially of rubber.

5. The tracked vehicle of claim 1, wherein the suspension assembly further includes a suspension case that at least partially encloses the suspension arm and the suspension spring.

6. The tracked vehicle of claim 1 wherein the track is positioned in a flat arrangement while the wheel assembly is locked in the towing position.

7. A tracked vehicle, comprising:
a vehicle body;
a track coupled to the vehicle body;
a suspension assembly; and
a wheel assembly coupled to the vehicle body via the suspension assembly, the wheel assembly including a wheel and being operable to assume a towing position in which at least a portion of the wheel extends below the track to enable the tracked vehicle to be towed on the wheel without the track making ground contact;
wherein the suspension assembly is configured to provide suspension for vertical movement of the wheel relative to the vehicle body;
wherein the suspension assembly includes a suspension arm, the suspension arm having a first portion coupled to the vehicle body and a second portion coupled to the wheel assembly, the second portion configured to move through a suspension travel;
wherein the first portion of the suspension arm is coupled to the vehicle body via a pivot joint; and
wherein the wheel assembly includes:
an axle about which the wheel is enabled to spin;
an offset arm coupled to the axle; and
an offset shaft coupled to the offset arm and extending substantially parallel to the axle, wherein the offset shaft is rotatably coupled to the second portion of the suspension arm to enable the wheel to swing into and out of the towing position.

8. The tracked vehicle of claim 7, wherein the second portion of the suspension arm includes a receiver configured to receive the offset shaft and to enable rotation of the offset shaft relative to the receiver.

9. The tracked vehicle of claim 8, wherein the suspension arm further includes a retaining structure configured to engage with a complementary retaining structure of the wheel assembly to selectively prevent rotation of the wheel assembly when the wheel is in the towing position.

10. The tracked vehicle of claim 9, wherein the second portion of the suspension arm further includes a stop structure configured to engage with a complementary stop structure of the wheel assembly to prevent over-rotation of the wheel assembly about the offset shaft when the offset shaft is engaged with the receiver.

11. A tracked vehicle, comprising:

a vehicle body;

a pair of tracks coupled to the vehicle body; and a plurality of wheel assemblies coupled to the vehicle body via respective suspension assemblies, the plurality of wheel assemblies including respective wheels operable to assume a towing position in which the wheels extend below the tracks to enable the tracked vehicle to be towed on the wheels without the tracks making ground contact;

wherein the suspension assemblies are configured to provide suspension for vertical movement of respective wheels relative to the vehicle body; and wherein a particular suspension assembly of the suspension assemblies includes a suspension arm and a suspension spring, the suspension arm having a first portion coupled to the vehicle body and a second portion coupled to a particular wheel assembly, the second portion configured to move vertically through a suspension travel while the wheel assembly is locked in the towing position, the suspension spring operatively coupled between the suspension arm and the vehicle body.

12. The tracked vehicle of claim 11, wherein the particular suspension assembly further includes a suspension travel stop configured to limit the suspension travel.

13. The tracked vehicle of claim 11, wherein the first portion of the suspension arm is coupled to the vehicle body via a pivot joint.

14. The tracked vehicle of claim 13, wherein the particular wheel assembly includes:

an axle about which the wheel is enabled to spin;

an offset arm coupled to the axle; and an offset shaft coupled to the offset arm and extending substantially parallel to the axle, wherein the offset shaft is rotatably coupled to the second portion of the suspension arm to enable the wheel to swing into and out of the towing position.

15. The tracked vehicle of claim 11, wherein the suspension spring is composed at least partially of rubber.

16. The tracked vehicle of claim 11 wherein the tracks are positioned in a flat arrangement while the wheel assembly is locked in the towing position.

* * * * *